(12) United States Patent
Mori et al.

(10) Patent No.: US 8,995,046 B2
(45) Date of Patent: Mar. 31, 2015

(54) SUSPENDED PARTICLE DEVICE, LIGHT CONTROL DEVICE USING THE SAME, AND DRIVING METHOD

(71) Applicant: Hitachi Chemical Company, Ltd., Chiyoda-ku, Tokyo (JP)

(72) Inventors: Shunsuke Mori, Hitachi (JP); Hiroki Kaneko, Hitachinaka (JP); Haruo Akahoshi, Hitachi (JP)

(73) Assignee: Hitachi Chemical Company, Ltd., Tokyo (JP)

( * ) Notice: Subject to any disclaimer, the term of this patent is extended or adjusted under 35 U.S.C. 154(b) by 58 days.

(21) Appl. No.: 13/761,670

(22) Filed: Feb. 7, 2013

(65) Prior Publication Data
US 2013/0201549 A1 Aug. 8, 2013

(30) Foreign Application Priority Data
Feb. 7, 2012 (JP) .................................. 2012-023698

(51) Int. Cl.
*G02B 26/00* (2006.01)
*G09G 3/34* (2006.01)
*G02F 1/167* (2006.01)
*G02F 1/17* (2006.01)
(Continued)

(52) U.S. Cl.
CPC ................ *G02F 1/167* (2013.01); *G02F 1/172* (2013.01); *G02B 26/026* (2013.01); *G09G 3/3433* (2013.01); *G09G 3/344* (2013.01); *G09G 3/3453* (2013.01); *G02F 1/0018* (2013.01); *G02F 1/0027* (2013.01); *G02F 1/133348* (2013.01);
(Continued)

(58) Field of Classification Search
CPC .................. G02B 26/00; G02B 26/026; G02B 2006/12047; G02B 2006/12142; G02F 1/00; G02F 1/167; G02F 1/0018; G02F 1/0027; G02F 1/3558; G02F 2202/07; G02F 1/05; G02F 1/172; G02F 2001/1676; G02F 2203/24; G09G 3/3406; G09G 3/3433; G09G 3/344; G09G 3/00; H01G 7/02

USPC .......... 359/228, 245, 253, 271, 296; 345/107; 204/450, 600; 425/93
See application file for complete search history.

(56) References Cited

U.S. PATENT DOCUMENTS 4,046,456 A * 9/1977 Bonne .......................... 359/296
4,123,346 A 10/1978 Ploix
(Continued)

FOREIGN PATENT DOCUMENTS

JP    2008-158040 A2    7/2008
JP    2008-209953 A2    9/2008
(Continued)

*Primary Examiner* — Loha Ben
(74) *Attorney, Agent, or Firm* — Volpe and Koenig, P.C.

(57) ABSTRACT

A suspended particle device includes a first substrate; a second substrate; a first electrode that can be controlled for a potential; a second electrode that can be controlled for a potential different from that of the first electrode; an electrified body; and a liquid suspension containing charged light control particles and a dispersion medium, in which the first electrode, the second electrode and the electrified body are disposed between the first substrate and the second substrate, and the liquid suspension is sealed between the first substrate and the second substrate, and the light control particles are capable of being accumulated to a periphery of the electrified body. Thus, it is possible to ensure uniformity of transmission light as well as to hold a light transmittance state in a state where the power supply is stopped.

21 Claims, 24 Drawing Sheets

(51) Int. Cl.
*G02B 26/02* (2006.01)
*G02F 1/00* (2006.01)
*G02F 1/1333* (2006.01)
*H01G 7/02* (2006.01)

(52) U.S. Cl.
CPC .......... *G02F 2203/24* (2013.01); *G09G 3/3406* (2013.01); *H01G 7/02* (2013.01); *G02F 2001/1676* (2013.01); *G02F 2202/07* (2013.01)
USPC .......... 359/296; 359/245; 359/228; 204/450; 204/490

(56) References Cited

U.S. PATENT DOCUMENTS

| | | | |
|---|---|---|---|
| 5,929,953 A * | 7/1999 | Hiji et al. | 349/86 |
| 6,531,997 B1 * | 3/2003 | Gates et al. | 345/107 |
| 6,885,789 B2 * | 4/2005 | Liu | 385/16 |
| 7,009,756 B2 | 3/2006 | Kishi et al. | |
| 7,510,638 B2 * | 3/2009 | Herman et al. | 204/490 |
| 7,656,576 B2 * | 2/2010 | Suwabe et al. | 359/296 |
| 8,623,191 B2 * | 1/2014 | Cernasov | 204/450 |
| 2002/0063673 A1 | 5/2002 | Kawai | |
| 2008/0111444 A1 | 5/2008 | Mabuchi | |
| 2008/0258565 A1 | 10/2008 | Murayama et al. | |
| 2010/0127595 A1 | 5/2010 | Suzuki et al. | |
| 2011/0012438 A1 | 1/2011 | Kashiwagi et al. | |
| 2012/0019897 A1 | 1/2012 | Mori et al. | |

FOREIGN PATENT DOCUMENTS

| | | |
|---|---|---|
| JP | 2012-27326 A2 | 2/2012 |
| JP | 2012-137575 A2 | 7/2012 |

\* cited by examiner

US 8,995,046 B2

SUSPENDED PARTICLE DEVICE, LIGHT CONTROL DEVICE USING THE SAME, AND DRIVING METHOD

CLAIM OF PRIORITY

The present application claims priority from Japanese Patent application serial No. 2012-023698, filed on Feb. 7, 2012, the content of which is hereby incorporated by reference into this application.

BACKGROUND OF THE INVENTION

1. Field of the Invention

The present invention concerns a suspended particle device, a light control device using the same, and a driving method thereof.

2. Description of Related Art

Japanese Unexamined Patent Application Publication No. 2008-209953 (Patent Document 1) discloses the following technique.

That is, the technique concerns a display in which a dispersion system having fine particles dispersed therein is put between a pair of transparent substrates at least one of them being transparent to form a cell, and the fine particles are moved electrophoretically thereby changing light transmittance or light reflectance in the direction perpendicular to the substrate, in which an inter-electrode pitch p between driving electrodes and a common electrode disposed for application of an electric field is 5 μm to 100 μm, a cell thickness d is 0.2 to 1.5 times p, and the electrode area ratio of the driving electrode is 20% or less. Thereby, the technique enables monochromatic and color display at high transmittance, high contrast, and low driving voltage, in reduced thickness and weight, and at high operation speed. And the display is applicable to various uses such as optical modulation devices of super high definition, displays for portable equipment, electronic paper, large-scaled monitors, large-scaled TV, super-large size public displays, etc.

Japanese Unexamined Patent Application Publication No. 2008-158040 (Patent Document 2) discloses the following technique.

The technique provides a light control material including an energy-beam curable polymeric medium containing a resin having an ethylenically unsaturated bond, a photopolymerization initiator, and droplets of a light control liquid suspension containing a dispersion medium and light control particles dispersed in a fluidizable state in the dispersion medium, in which the dispersion medium in the light control liquid suspension can be phase-separated from the polymeric medium and the curing product thereof, and the concentration of the ethylenically unsaturated bonds of the resin having the ethylenically unsaturated bonds is 0.3 mol/Kg to 0.5 mol/Kg.

SUMMARY OF THE INVENTION

The present invention provides a suspended particle device including: a first substrate; a second substrate; a first electrode that can be controlled for a potential; a second electrode that can be controlled for a potential different from that of the first electrode; an electrified body; and a liquid suspension containing charged light control particles and a dispersion medium, in which the first electrode, the second electrode and the electrified body are disposed between the first substrate and the second substrate, and the liquid suspension is sealed between the first substrate and the second substrate, and the light control particles are capable of being accumulated to a periphery of the electrified body.

The suspended particle device according to the present invention can achieve compatibility between holding of the light transmittance state in a state where the power supply is stopped and ensuring of the uniformity of transmission light.

Further, according to the present invention, power consumption can be saved since electric power for holding the transparent state is not required.

BRIEF DESCRIPTION OF THE DRAWINGS

FIG. 2 is changed from 0 V to 100 V in the driving control shown in FIG. 10;

DETAILED DESCRIPTION OF THE PREFERRED EMBODIMENTS

Figure 1:
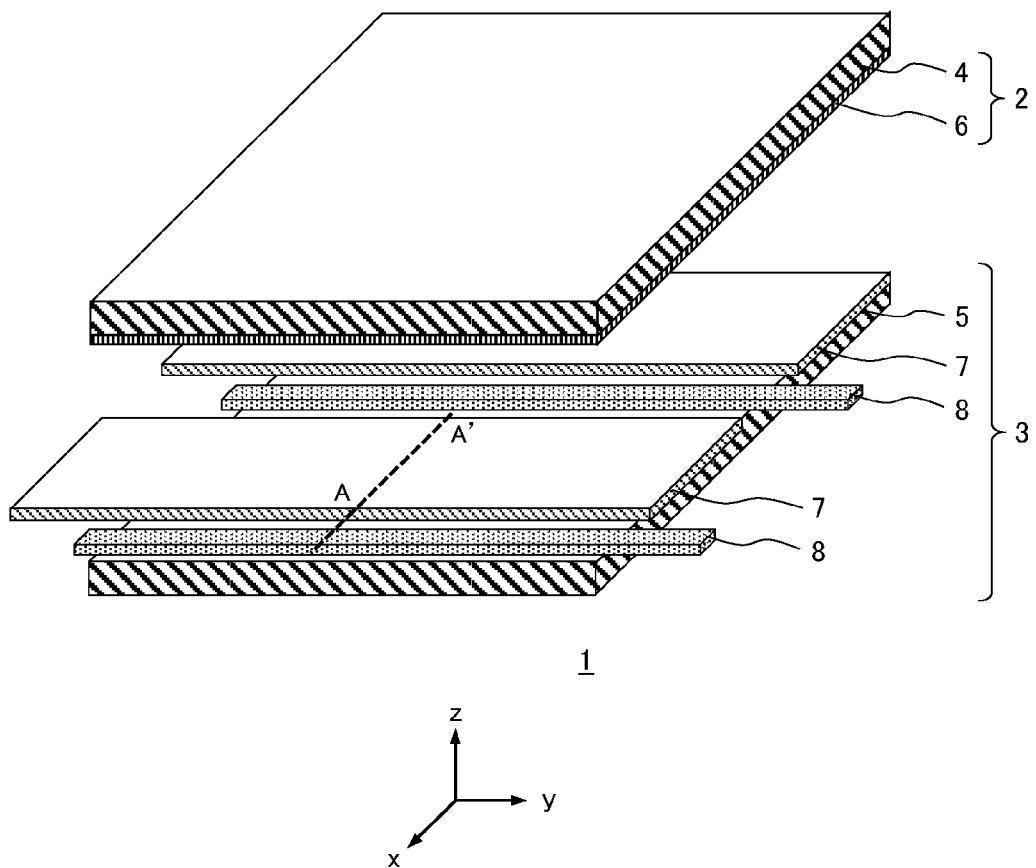
FIG. 1 is an exploded perspective view illustrating the configuration of a suspended particle device in a first embodiment of the present invention.

In a light control device using a general suspended particle device, light incident on the suspended particle device and the light control device is in a light-blocking state by absorption and scattering of the micro particles since fine particles in a liquid suspension are in a dispersed state when a voltage is not applied to the suspended particle device. Accordingly, the light control device using the suspended particle device is normally black (low transmittance upon not application of voltage), and the light-blocking state is determined depending on the structure of the suspended particle device, the amount of the fine particles in the liquid suspension, the state of fine particles, etc.

In the display device described in Patent Document 1, the light-blocking state, that is, the transmittance of the cell is modified by putting a dispersion state of fine particles in the cell into an optically blocked state of the cell in the direction perpendicular to the substrate, applying a voltage between the common electrode disposed between the substrates and the fine wires thereby displacing the fine particles in a direction parallel to the substrate, depositing the fine particles in the direction parallel to the substrate to the fine line-like driving electrode, thereby modifying the amount of the fine particles in a dispersed state. Accordingly, it is necessary to increase the amount of the fine particles in the dispersed state in order to lower the visibility through the suspended particle device and the light control device. On the other hand, when the voltage cannot be applied to the fine line driving electrode in a light-blocking state where the fine particles are dispersed in a large amount and the visibility is low, the device cannot be held at or modified to a transparent state capable of obtaining the visibility through the suspended particle device and the light control device.

Accordingly, when the voltage application is suddenly stopped in the suspended particle device and the light control device having a light-blocking state of low visibility, it is difficult to modify the state into a transparent state capable of obtaining visibility. A problem is caused by lowering of the visibility in view of safety when such suspended particle device and the light control device are applied, for example, to window glass or ceiling window used in buildings, window glass used in aircrafts, railway vehicles, or ships, window glass of automobiles, light control devices for various kinds of devices, etc.

The present invention intends to attain compatibility between electric modification of the light-blocking state and holding of light transmittance upon stopping of the power supply.

A suspended particle device and a light control device using the same, as well as a driving method therefor according to preferred embodiments of the present invention are to be described.

The suspended particle device has a first substrate and a second substrate, in which a first electrode that can be controlled for a potential, a second electrode that can be controlled for a potential different from that of the first electrode, and an electrified body are disposed, and liquid suspension containing charged light control particles and a dispersion medium are sealed between the first substrate and the second substrate, and which has a function capable of accumulating light control particles at the periphery of the electrified body.

In the suspended particle device, it is preferred that the first electrode is disposed on a surface of the first substrate, and a second electrode and an electrified body are disposed on a surface of the second substrate.

In the suspended particle device, a third electrode that can be controlled for a potential different from that of the first electrode and the second electrode is preferably disposed between the first substrate and the second substrate.

In the suspended particle device, the third electrode is preferably disposed on a surface of the second substrate.

The suspended particle device preferably has a function capable of controlling the orientation state of the light control particles by applying an AC voltage (alternating-current voltage) to at least one of the first electrode and the second electrode thereby enabling to control the orientation state of the light control particles, and enabling the light control particles to be dispersed into the liquid suspension by the application of a DC (direct-current voltage) voltage to at least one of the first electrode and the second electrode.

The suspended particle device preferably has a function capable of controlling the orientation state of the light control particles by applying an AC voltage to at least one of the first electrode, the second electrode, and the third electrode thereby enabling to control the orientation state of the light control particles, and the light control particles to be dispersed into liquid suspension by the application of a DC voltage to at least one of the first electrode, the second electrode, and the third electrode.

In the suspended particle device, the first electrode and the second electrode are preferably light permeable.

In the suspended particle device, the third electrode is preferably light permeable.

In the suspended particle device, the area of the electrified body is preferably smaller than that of the second electrode.

In the suspended particle device, the area of the electrified body is preferably smaller than that of the third electrode.

In the suspended particle device, the second electrode and the electrified body are preferably disposed in a stripe-like pattern.

In the suspended particle device, the second electrode and the third electrode are preferably disposed in a stripe-like pattern.

The suspended particle device preferably has a function of controlling the orientation state of the light control particles by applying an AC voltage between the second electrode and the third electrode.

The suspended particle device preferably has a function of polarizing light incident on the liquid suspension by applying an AC voltage between the second electrode and the third electrode.

In the suspended particle device, the polar character of the electrified body on a surface in contact with the liquid suspension is preferably opposite to the polar character of the light control particles.

In the suspended particle device, the electrified body is preferably formed of an electret or ferroelectric.

In the suspended particle device, the light control particle preferably has optical anisotropy, is formed of one or more of rod-like members selected from the group consisting of polyperiodides, carbon-base materials, metal materials and inorganic compounds, and the aspect ratio of the light control particle is preferably from 5 to 30.

The suspended particle device preferably has a function capable of accumulating the light control particles to the electrified body by making a surface potential of the electrified body higher than the potential of the first electrode and the second electrode, and a function capable of dispersing the light control particles accumulated to the electrified body into the liquid suspension by making the potential of the first electrode higher than the potential of the second electrode and the surface potential of the electrified body.

The light control device preferably includes the suspended particle device, and a driving device controlling the suspended particle device.

A method of driving the suspended particle device is a method of driving a suspended particle device having a first substrate and a second substrate in which a first electrode that can be controlled for a potential, a second electrode can be controlled for a potential different from that of the first electrode, and an electrified body are disposed, and a liquid suspension containing charged light control particles and a dispersion medium is sealed between the first substrate and the second substrate, the method including a step of dispersing light control particles by applying an AC voltage to the liquid suspension by at least one of the first electrode and the second electrode, thereby controlling the orientation state of the light control particles, and dispersing the light control particles into the liquid suspension by applying a DC current to the liquid suspension by at least one of the first electrode and the second electrode, and a step of accumulating the light control particles to the periphery of the electrified body.

In the driving method of the suspended particle device, it is preferred that the step of dispersing the light control particles is a step of making the potential on the first electrode higher than the potential on the second electrode and the surface potential of the electrified body, and the step of accumulating the light control particles is a step of making the surface potential of the electrified body to higher than the potential on the first electrode and the second electrode.

In the method of driving the suspended particle device, it is preferred that, when the light control particles are in the orientation state, the reference potential of the AC voltage applied to at least one of the first electrode and the second electrode has a polar character identical with that of the surface potential at the surface in contact with the liquid suspension.

When the light control particles are in the orientation state, it is preferred that an average value of the AC voltage applied to at least one of the first electrode and the second electrode (central voltage) has a polar character identical with that of the surface potential at the surface in contact with the liquid suspension with the reference voltage being as G.N.D (ground potential).

The present invention is to be described specifically with reference to specific embodiments.

The following embodiments show specific examples of the present invention and the present invention is not restricted to such embodiments but can be changed and modified variously by those skilled in the art within the scope of the technical concept disclosed in the present specification. Further, throughout the drawings for explaining the embodiments, those having identical functions carry the same references for which duplicate descriptions may sometimes be omitted.

First Embodiment (Suspended Particle Device)

For easy understanding of this embodiment, description is to be made to a basic structure of the suspended particle device, etc. investigated by the present inventors.

Figure 2:
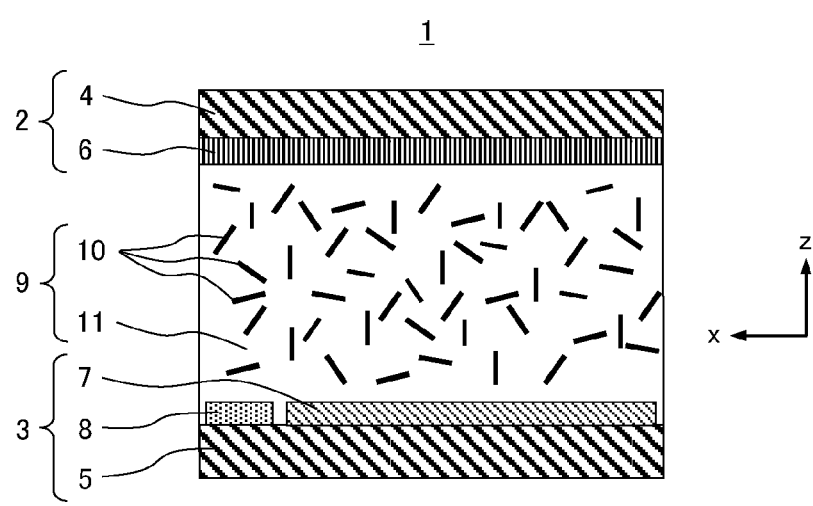
FIG. 2 is a fragmentary cross sectional view along a plane x-z containing a sectional line A-A' in FIG. 1 of the suspended particle device after assembling.

FIG. 1 is an exploded perspective view of a suspended particle device investigated by the present inventors. FIG. 2 illustrates a suspended particle device after assembling, as a cross sectional view along a plane x-z containing a cross sectional line A-A' in FIG. 1.

In a suspended particle display device (SPD) 1, a first plate member 2 and a second plate member 3 are disposed at a space. As shown in FIG. 2, a liquid suspension 9 containing light control particles 10 and a suspension medium 11 is sealed in the space.

The first plate member 2 has a configuration in which an X electrode 6 (first electrode) is disposed to a first substrate 4. On the other hand, the second plate member 3 has a configuration in which a Y electrode 7 (second electrode) and an electrified body 8 are disposed to a second substrate 5. As shown in FIG. 2, the first plate member 2 and the second plate member 3 have a configuration that the X electrode 6, the Y electrode 7, and the electrified body 8 are disposed so as to be in contact with the liquid suspension 9.

The suspended particle device 1 of this embodiment controls incident light in the direction of an axis z.

In the first plate member 2, a transparent X-electrode 6 formed of indium tin oxide (ITO) is formed on a surface of a first substrate 4 which is a transparent supporting base formed of a glass. On the other hand, in the second plate member 3, a transparent Y-electrode 7 formed of indium tin oxide (ITO) and the electrified body 8 are formed on the surface of a second substrate 5 which is a transparent supporting base formed of the glass.

The X electrode 6 of the first substrate 4 is formed over the entire one surface of the first substrate 4. On the other hand, the Y electrode 7 and stripe-like electrified bodies 8 are formed on one surface of the second substrate 5.

The width of the Y electrode 7 in the direction x in this embodiment is determined under such conditions that each of the driving states such as a transmissive hold state and a light-control state to be described later in the suspended particle device 1 can be attained and this is determined depending on the distance between the Y electrode 7 and the electrified body 8, the surface potential $V_c$ of the electrified body 8, and electric characteristics of the liquid suspension material containing the light control particles 10, and the width is preferably from 10 to 200 μm.

The width of the electrified body 8 is preferably from 10 to 300 μm in order to increase the transmittance in the transmissive hold state to be described later. Further, for lowering the visibility of the portion of the electrified body 8 in a state where the light control particles 10 are aggregated (for making the electrified body 8 difficult to be seen from the outside), and the width is more preferably from 10 to 70 μm.

In this embodiment, each width of the Y electrode 7 and the electrified body 8 is set to 10 μm and the distance between the Y electrode 7 and the electrified body 8 is also set to 10 μm in order to extend the controllable region of the light control particles 10 in a light-control state to be described later.

One or both of the first substrate 4 and the second substrate 5 may also be a resin film, for example, of polyethylene terephthalate (PET), polycarbonate (PC), cycloolefin polymer (COP), etc. instead of the glass. The X electrode 6 and the Y electrode 7 may be formed so as to be transparent also by using indium zinc oxide (IZO), tin oxide, zinc oxide, carbon nanotube, graphene, etc. instead of ITO.

The electrified body is, for example, electret or ferroelectric material and is preferably transparent or less chromic for increasing the transmittance in the light-control state and lowering the visibility of the electrified body 8 in a light-control state (so that a user does not recognize the presence in appearance). For lowering the visibility of the electrified body 8 in the light-blocking state (light-control state at low transmittance), pigment, etc. may be added to the electrified body 8 to make the electrified body 8 to a color system similar with that of the liquid suspension 9 and the light control particles 10. The electrified body 8 preferably has solution resistance or chemical resistance to the material of the liquid suspension 9. The electrified body 8 may be an inorganic material or organic material.

In this embodiment, plural linear electrified bodies 8 are formed on the surface of the second substrate 5. The electrified body is selected in accordance with the charged state of the light control particles 10 in the liquid suspension 9, the compatibility with the dispersion medium 11, the kind of the supporting base, and the productivity such as adhesion with the supporting base. The electrified body 8 includes electret, ferroelectric, etc. The ferroelectric material includes inorganic materials such as titanates having perovskite structure, for example, barium titanate ($BaTiO_3$), lead zirconate titanate (PZT), lead (II) titanate (PT), aluminum oxide, etc. and those prepared by dispersing such inorganic materials in an organic resin such as an epoxy resin, or organic materials such as polyvinylidene fluoride (PVDF), P(VDF-TrFE) which is a copolymer thereof with trifluoroethylene, and resins containing them. The electrified body 8 of this embodiment is formed of polyethylene which is an electretted organic polymer with a view point of flexibility when the supporting base is formed of a resin or the like. In addition, the organic polymer includes polypropylene, etc. as olefinic resins, polyethyele terephthtate (PFT) as polyester, polytetrafluoroethylene (PTFE) as fluoro carbon polymer, nylon as a polyamide resin used alone or in plurality. They are selected in accordance with the electric characteristics such as charged state of the liquid suspension 9 and the light control particles 10, constituent materials for the supporting base, etc., and working circumstances. A colorant such as dye or pigment can also be added to the organic polymers for color control in the light-control state. Further, metal or inorganic material may also be added in order to control the charged state.

For electretting an organic polymer, a resin sheet having planes of different polar character is obtained by heating a resin sheet into a molten state, and applying a DC electric field in a direction perpendicular to the plane of the resin sheet thereby polarizing the organic polymer in the direction of the electric field and subsequently cooling to solidify the polymer while holding the polarization state. In this process, desired charged state and the surface potential $V_c$ can be obtained for the electrified body 8 by controlling the intensity of the DC electric field. Other electretting methods include charge injection by the electric discharge to the organic polymer or energy beam irradiation. The electrified body 8 and the shape thereof in this embodiment are obtained by dividing the electretted resin sheet into strips. The surface potential $V_C$ can be measured by a surface potential meter or an electric field meter. The surface potential $V_C$ is preferably at a voltage from 1 to 100 V at which drivings in the transmissive hold state and the light-control state are compatible. For suppressing aggregation of the light control particles 10 to the electrified body 8 during driving in the light-control state at low transmittance, it is preferably 5 to 50 V. In this embodiment, the surface potential $V_C$ of the electrified body 8 is set to 15 V.

The polar character at the surface of the electrified body 8 in contact with the liquid suspension 9 is opposite to that of the light control particles 10. As described later, since the light control particles 10 of this embodiment are always charged negatively, the polar character of the electrified body 8 of this embodiment on the surface in contact with the liquid suspension 9 is set positive.

In this embodiment, while the X electrode 6 and the Y electrode 7 are formed over the entire surface of one of the first substrate 4 or the second substrate 5, this is not restrictive and the electrode may be formed as a line, a circle, or a combined pattern thereof to a portion of the surface, or the electrode may be arranged in accordance with the shape of a character. Further, the X electrode 6 or the Y electrode 7 may also be divided in order to drive the light control operation divisionally on respective regions. Furthermore, an adhesive may also be used so as to fix the electrified body 8.

The first plate member 2 and the second plate member 3 are opposed to each other and bonded by coating a sealant containing spacer beads, etc. to the end (not illustrated) of the first plate member 2 and the second plate member 3. Thus, a space is formed for the liquid suspension 9 to be filled (liquid suspension filling space) for a distance of 25 µm between the first plate member 2 and the second plate member 3. The distance is preferably from 3 to 100 µm and optionally determined, for example, depending on the maximum driving voltage of a driving device 14, the amount of charge on the light control particles 10, the electric characteristic and the viscoelasticity of the dispersion medium 11, the surface voltage of the electrified body 8, etc. Further, the spacer beads may also be irregularly disposed dispersingly between the first plate member 2 and the second plate member 3 to maintain the liquid suspension filling space. The spacer beads include, for example, a glass or polymer, which are preferably stable to the sealant. Further, when the spacer beads are scattered between the first plate member 2 and second plate member 3, the refractive index of the spacer beads is preferably approximate to the refractive index of the dispersion 11.

The liquid suspension 9 contains the light control particles 10 and the dispersion medium 11. That is, in the liquid suspension 9, the light control particles 10 are dispersed in the dispersion medium 11.

The light control particle 10 is, for example, formed of a polyperiodide, has form anisotropy and optical anisotropy of different optical absorption due to the direction of orientation, has an aspect ratio of other than 1 in view of the shape, and is charged negatively. It is preferred that the light control particles 10 cause orientation polarization at or lower than the frequency of the AC voltage in the driving period of the suspended particle device 1. In this case, for the light control particles 10, a dielectric material of low conductivity is used preferably. The dielectric material of low conductivity includes polymer particles, particles coated with polymer, etc. The shape of the light control particles 10 includes a rod-like or plate-like shape. When the light control particle 10 is formed into the rod-like shape, resistance to the rotational movement of the light control particle 10 relative to the electric field and increase in the haze during transmission can be suppressed. Preferably, the aspect ratio of the light control particle 10 is, for example, about 5 to 30. Optical anisotropy attributable to the shape of the light control particle 10 can be developed by defining the aspect ratio of the optical control particle 10 to 10 or more.

The size of the light control particle is preferably 1 µm or less, more preferably, from 0.1 to 1 µm and, further preferably, from 0.1 to 0.6 µm. If the size of the light control particle 10 is more than 1 µm, a problem of lowering the transparency may sometimes occur, for example, generation of light scattering or lowering of the orientation movement in the dispersion medium when an electric field is applied. The size of the light control particle 10 is measured under electron microscopic observation, etc.

Specific example of the light control particle 10 includes particles formed of carbon-base materials such as carbon black (anisotropic carbon), organic pigments containing dyes, metal materials such as copper, nickel, iron, cobalt, chromium, titanium, and aluminum, and inorganic compounds such as silicon nitride, titanium nitride, and aluminum nitride, and they are charged positively or negatively. The carbon black, metal, inorganic compound, etc. are not charged with specific charges by themselves but they may also be particles covered with a polymer having a property of being charged to a predetermined potential. Further, for the liquid suspension 9, a single kind of light control particles 10 may be dispersed in the dispersion medium 11. Further, plural kinds of light control particles 10 may also be dispersed in the dispersion medium 11 for color correction (color control) in each of the driving states to be described later.

In this embodiment, the concentration of the light control particles 10 in the liquid suspension 9 is set to 2.0 wt %. The concentration of the light control particles 10 is at such a concentration as not hindering rotational motion, dispersion, aggregation, and localizing operation due to interaction with other light control particles 10 and it is, preferably, from 0.1 to 20 wt %.

As the dispersion medium 11, a liquid copolymer composed of an acrylic acid ester oligomer, a polysiloxane (silicone oil), etc. are referred. As the dispersion medium 11, it is preferred to use a liquid copolymer having a viscosity in which the light control particles 10 can be suspended, a high resistance, no affinity with the first substrate 4, the second substrate 5, and each of the electrodes, a refractive index approximate to that of the first substrate 4 and the second substrate 5, and having a dielectric constant different from that of the light control particles 10. Specifically, the resistivity of the dispersion medium 11 is preferably from $10^{12}$ to $10^{15}$ Ωcm at a temperature of 298K.

If difference of the dielectric constant is present between the dispersion medium 11 and the light control particle 10, this can act as a driving force under an AC electric field in the orientation operation of the light control particles 10 to be described later. In this embodiment, the specific dielectric constant of the dispersion medium 11 is set to 3.5 to 5.0.

In the liquid suspension filling space formed in the gap between the first plate member 2 and the second plate member 3, the liquid suspension 9 is filled by a capillary action from the end not adhered by a sealant. After filling the liquid suspension 9 between the first plate member 2 and the second plate member 3, the not adhered end is adhered and sealed by a sealant. Thus, the liquid suspension 9 is isolated from external air. In this embodiment, the liquid suspension 9 is filled by the capillary action but, depending on the size of the suspended particle device 1 or the arrangement of the electrified body 8, the liquid suspension 9 may be coated by a bar-coating method or a one drop filling method (ODE) under vacuum before adhesion of the first plate member 2 and the second plate member 3 and, subsequently, the first plate member 2 and the second plate member 3 may be bonded and adhered and sealed in order to prevent the ununiformity of the concentration of the light control particles 10 due to aggregation of the light control particles 10 to the electrified body 8.

In this embodiment, the light control particle 10 is formed of a polyperiodide, and a liquid copolymer composed of an acrylic acid ester oligomer is used for the dispersion medium 11.

(Light Control Device)

Figure 3:
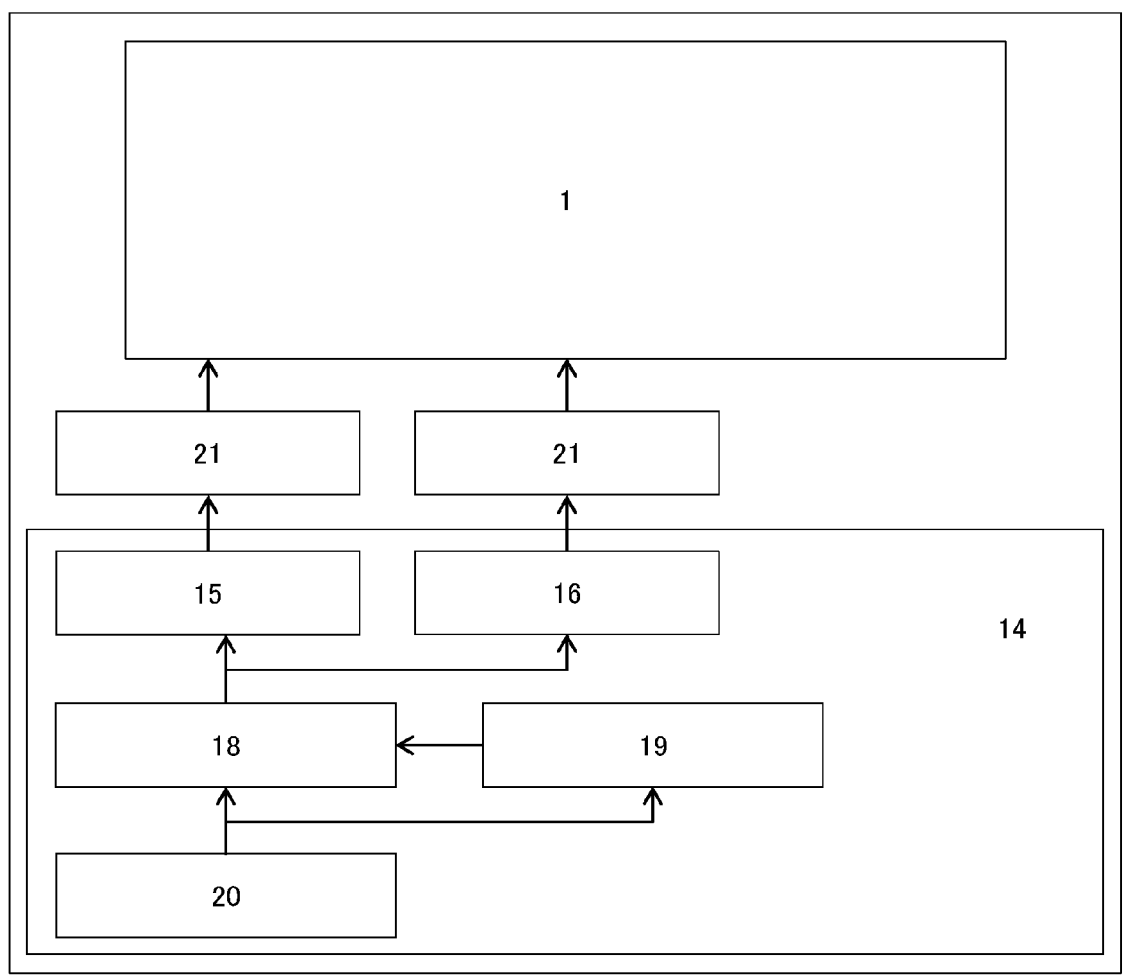
FIG. 3 is a block diagram showing a configuration of a light control device using the suspended particle device.

FIG. 3 is a block diagram showing a configuration of a light control device having a suspended particle device 1.

In the drawing, a light control device 13 has a light control section as a suspended particle device 1 and a control section as a driving device 14. Each of the electrodes of the suspended particle device 1 and each of electrode output circuits of the driving device 14 are connected by way of an interconnecting conductor 21.

The driving device 14 includes an X electrode output circuit 15 for driving an X electrode 6, a Y electrode output circuit 16 for driving the Y electrode 7 of the suspended particle device 1, a driving control circuit 18 for controlling the output circuits, a signal processing circuit 19 for processing input signals that control the light control region, light-control state and dispersion state of the light control particles 10, and a driving power supply 20 for applying a voltage to the suspended particle device 1 and each of the circuits.

The interconnecting conductor 21 preferably has low resistance and low loss, and is formed of conductive rubber (rubber connector), flexible printed circuit (FPC), a tape carrier package (TCP), a conductive tape, etc. The interconnecting conductor 21 and each of the electrodes and each of the electrode output circuits are wired by being pinched and fixed with a resin or the like, or by adhering the conduction portion with a conductive adhesive such as a metal paste or a conductive polymer, or with a solder or the like if the supporting base is a glass having high heat resistance. The conductive adhesive includes, for example, metal paste containing silver or the like, anisotropic conductive paste, anisotropic conductive film (ACE), etc.

Each of the electrode output circuits and other circuit devices constituting the driving device 14 may be disposed on the flexible printed circuit as the interconnecting conductor. Further, the light control device 13 may also have an external signal input section for inputting external environment information signals regarding incident light and temperature to the signal processing circuit 19. Further, it may also have self failure diagnosis section for inputting failure information signals regarding accidental constitutional failure into the signal processing circuit 19.

The light control device 13 of this embodiment can be used preferably for partitions inside and outside rooms, window glass or roof light window for buildings, various flat display devices used in electronic industry and video equipment, various instrument panels, substitutes for existent liquid crystal display devices, optical shutters, various advertisement and notice boards inside and outside the rooms, window glass used for aircrafts, railway vehicles, or ships, window glass, back mirror and sunroof of automobiles, spectacles, sunglass, sun visors, image pick-up devices, etc. As the application method, the light control device 13 of this embodiment may be used directly but, depending on the application use, the suspended particle device 1 and the light control device 13 of this embodiment may be interposed between two substrates and used, or they may be appended and used on the surface of the base. As the supporting base, for example, a glass, polymeric film, etc. can be used in the same manner as for the first substrate 4 and the second substrate 5.

(Driving Method of Suspended Particle Device)

Figure 4A:
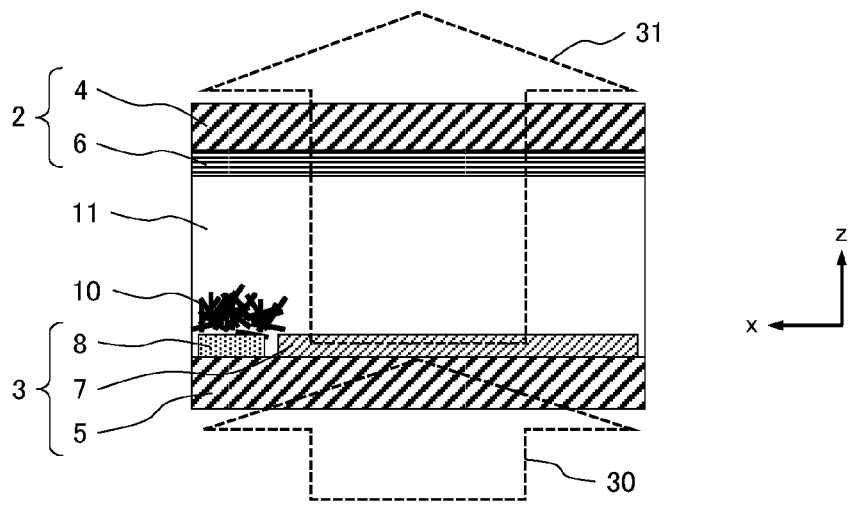
FIG. 4A is a fragmentary cross sectional view of the suspended particle device in FIG. 1 and FIG. 2 illustrating the state of light control particles and the optical path of incident light in a transmissive hold state.
Figure 4B:
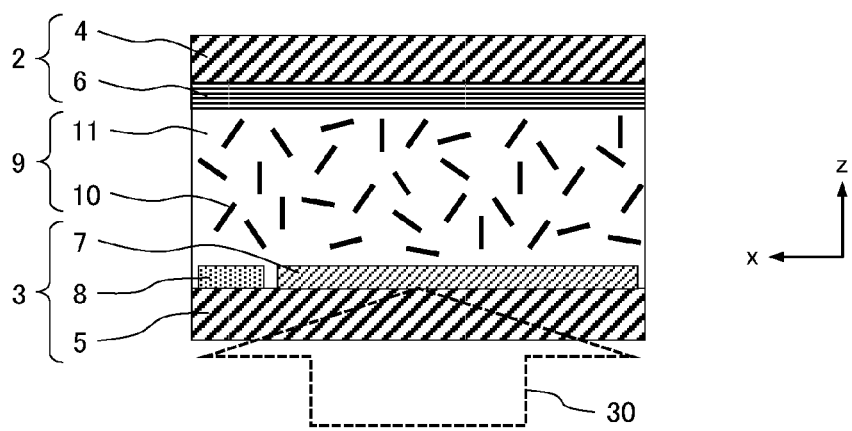
FIG. 4B is a fragmentary cross sectional view of the suspended particle device in FIG. 1 and FIG. 2 illustrating the state of light control particles and the optical path of incident light in a light-control state at low transmittance.
Figure 4C:
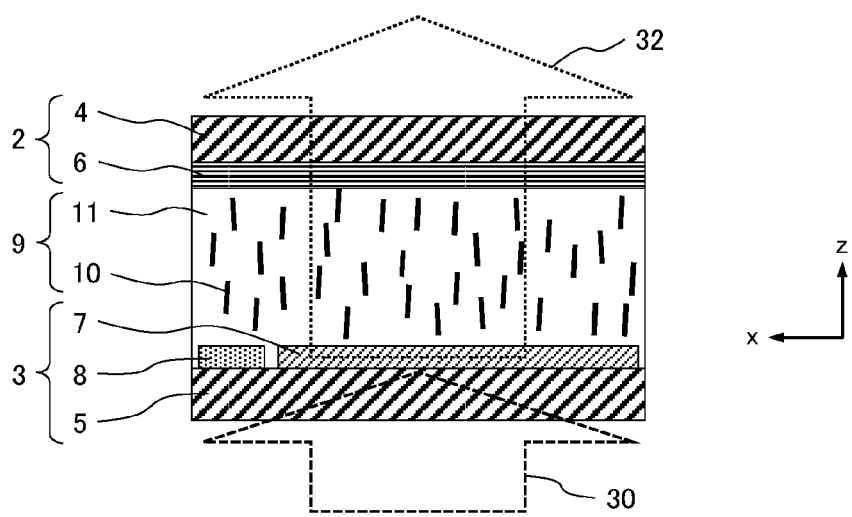
FIG. 4C is a fragmentary cross sectional view of the suspended particle device of FIG. 1 and FIG. 2 illustrating the state of light control particles and the optical path of incident light in a light-control state at high transmittance.
Figure 5:
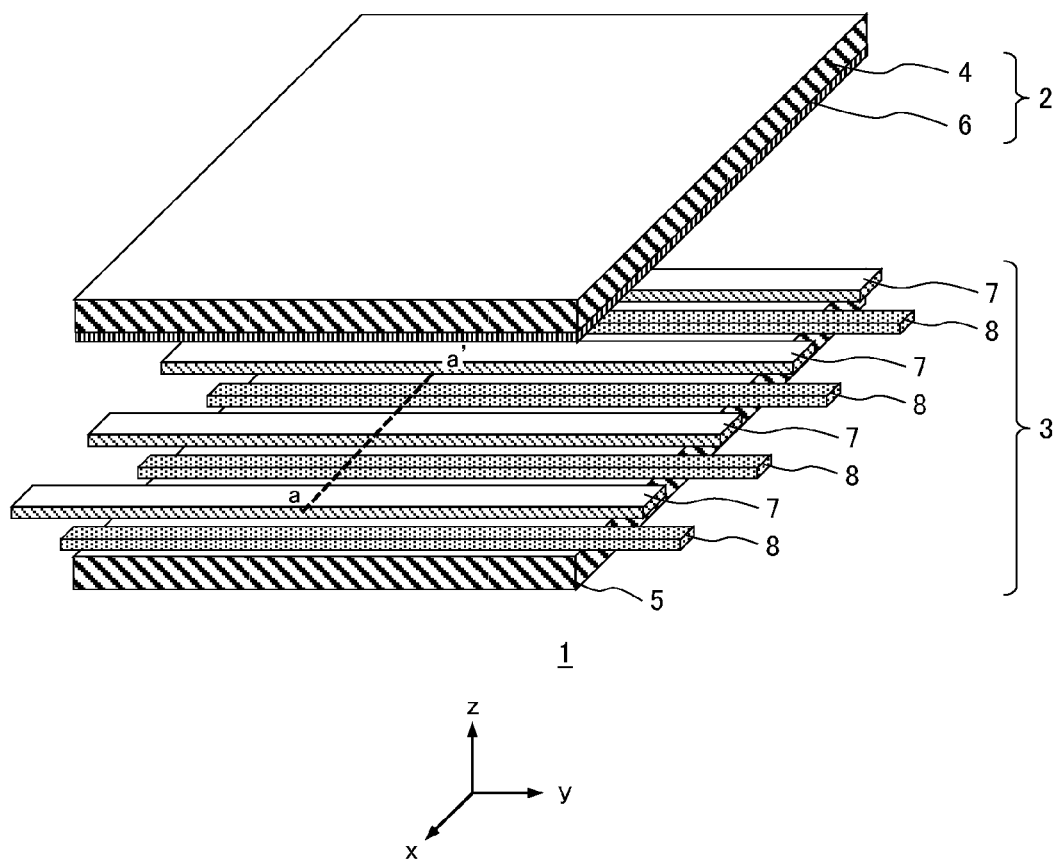
FIG. 5 is an exploded perspective view illustrating a configuration of a modified example of the suspended particle device shown in FIG. 1.
Figure 6:
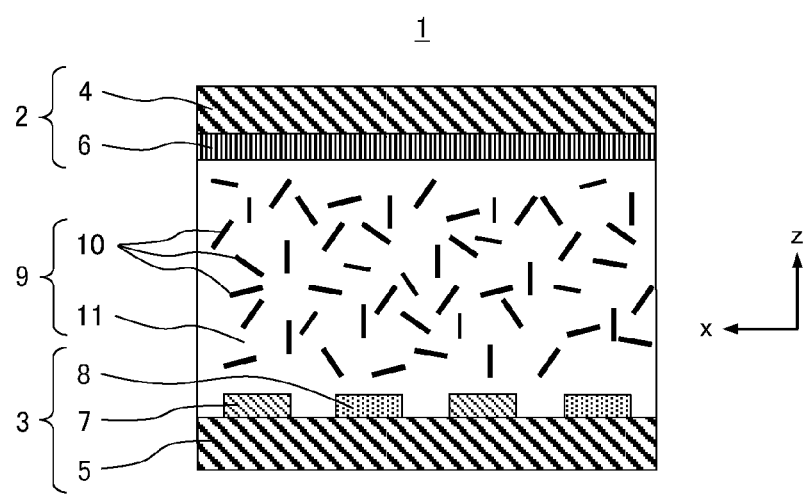
FIG. 6 is a fragmentary cross sectional view along a plane x-z containing a sectional line a-a' in FIG. 5 of the suspended particle device after assembling.
Figure 8:
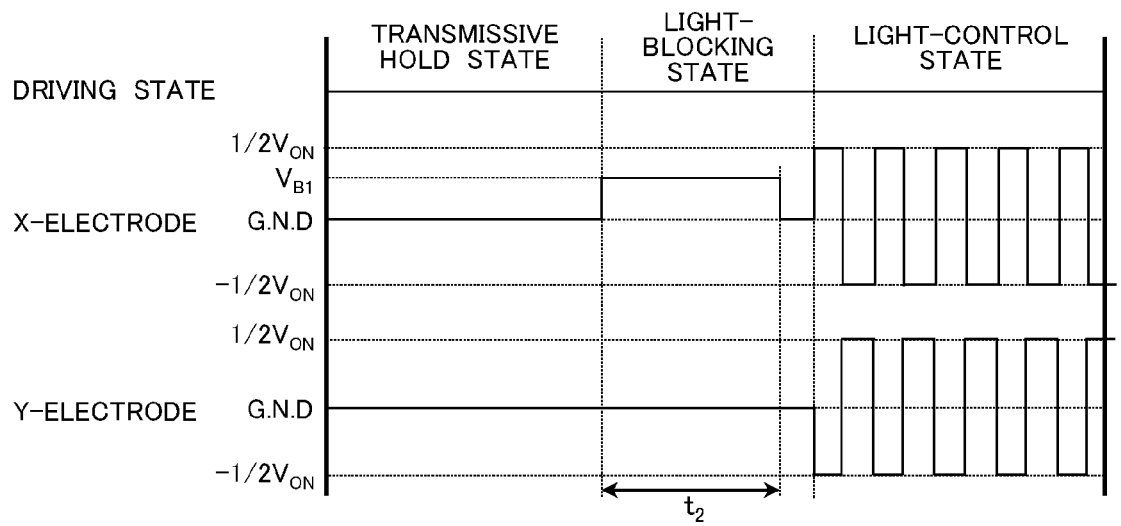
FIG. 8 is a graph showing a driving waveform from a transmissive hold state by way of a light-blocking state to a light-control state in the control according to the light control device of the first embodiment.

FIG. 4A to 4C show distribution of the light control particles 10 in a driving state of the suspended particle device illustrated in FIG. 2. FIG. 4A shows a transmissive hold state and FIG. 4B shows a light-blocking state (light-control state at low transmittance), and FIG. 4C shows a light-control state at high transmittance. Further, FIG. 8 shows a driving waveform of changing the state from the transmissive hold state by way of the light-blocking state to the light-control state at high transmittance assuming a reference voltage as G.N.D.

Since the light control particles 10 of this embodiment are charged negatively while the polar character at the surface of the electrified body 8 on the side of the liquid suspension 9 is positive, the electrified body 8 is at a higher potential than that of the X electrode 6 and the Y electrode 7 as shown in FIG. 4A in a transmissive hold state not applying a voltage to the X electrode 6 and the Y electrode 7. Hence the light control particles 10 dispersed in the liquid suspension 9 aggregate on the surface of the electrified body 8, or localized to the electrified body 8. The aggregation and localization state to the electrified body 8 is determined depending on factors including the surface potential of the electrified body 8 on the side of the liquid suspension 9 (surface voltage) $V_C$, the arrangement between the X electrode 6 and the Y electrode 7 to the electrified body 8 (positional relation), respective shapes, size, etc. concentration, dielectric constant, and shape of the light control particles 10, affinity with the dispersion medium 11, etc., or factors of the dispersion medium 11 including viscosity, etc.

Accordingly, the aggregation and localization state are controlled by controlling the voltage $V_c$ relative to the structure of the suspended particle device 1 or the physical property of constituent materials. Due to aggregation and localization of the light control particles 10 to the electrified body 8, incident light 30 on the intersection between the X electrode 6 and the Y electrode 7 excepting the electrified body 8 can transmit through the liquid suspension 9 (dispersion medium 11) without absorption by the light control particles 10 or without scattering, to obtain large amount of transmission light.

Further, the aggregation and localization state can be held by electrostatic interaction between the light control particles 10 and the electrified body 8. Due to the interaction, power consumption for continuously applying the voltage VV is not necessary.

Each of the driving states including the transmissive hold state is based on the interaction between the light control particles 10 and the electrified body 8, and a charge controller may be added to the liquid suspension 9 of the suspended particle device 1 for holding each of the driving states and controlling the interaction for the change of the states. The charge controller includes metal salts in which anions of fatty acids such as stearic acid, lauric acid, ricinoleic acid and octylic acid and cations of alkaline earth metals are bonded, which are referred to as metal soaps.

In the light-blocking state (light-control state at low transmittance) shown in FIG. 4B, the light control particles 10 are not localized and aggregated to the electrified body 8 as in the transmissive hold state shown in FIG. 4A but the light control particles 10 are dispersed at random in the liquid suspension 9.

As shown in FIG. 8, when a DC voltage $V_{B1}$ is applied to the X electrode 6, a DC electric field that charges the X electrode 6 to a higher potential than the electrified body 8 is formed, particularly, between the X electrode 6 and the electrified body 8. Thus, the light control particles 10 are dispersed from the state aggregated to the electrified body 8 into the entire bulk of the liquid suspension 9 to attain the light-blocking state shown in FIG. 4B.

In this embodiment, the DC voltage $V_{B1}$ is applied only to the X electrode, but a DC or AC voltage may be applied also to the Y electrode so that the X electrode 6 is at a higher potential than that of the electrified body 8. Further, the potential may be floating (floating potential) for controlling the electric field distribution. Since the light control particles 10 in this embodiment are charged negatively and the X electrode 6 is at a higher potential than the electrified body 8, the light control particles 10 aggregated to the electrified body 8 during transmissive hold state move toward the X electrode 6. Since the width of the electrified body 8 is narrow and the dispersion medium 11 of the liquid suspension 9 is a material of high resistivity, the electric field between the electrified body 8 and the X electrode 6 spreads from the electrified body 8 to the X-electrode 6. Therefore, the light control particles 10 are transferred and dispersed so as to spread in the liquid suspension 9 and a substantially uniform dispersion state of the light control particles 10 can be obtained in the liquid suspension 9.

Application of the voltage $V_{B1}$ to the X electrode 6 is stopped after time $t_2$ when the light control particles 10 are dispersed substantially uniformly in the liquid suspension 9. The change of the state from aggregation to dispersion of the light control particles 10 is controlled by $V_{B1}$ and $t_2$. The voltage $V_{B1}$ depends on the structure of the suspended particle device 1, electric characteristics of the electrified body 8 such as surface potential $V_C$, residual polarization, and coercive electric field, the concentration, dielectric constant, shape, and charged state of the light control particles 10, and affinity thereof with other light control particles 10, as well as viscosity of the dispersion medium 11, etc.

Subsequently, when an AC voltage signal at a frequency $f_{ON}$ and at a voltage $V_{ON}$ is applied to the X electrode 6, the light control particles 10 are oriented in accordance with the application voltage $V_{ON}$ along the direction of the electric field by dielectric polarization or the like. That is, when $V_{ON}$ is low, the order of the orientation state of the light control particles 10 is low and they are in a low orientation state or a random state as shown in FIG. 4B. And the light transmission is blocked since the light incident on the suspended particle device 1 is absorbed or scattered.

On the other hand, when the voltage $V_{ON}$ is sufficiently high, the light control particles 10 are oriented so as to be along the direction of the electric field as shown in FIG. 4C. Accordingly, when the directions of the incident light 30, the electric field and the particle orientation are identical, the ratio that the incident light 30 transmits through the liquid suspension 9, that is, the amount of the transmission light 31 (non-modulated light) to the amount of the incident light 30 (transmittance T) changes in accordance with the degree of orientation of the light control particles 10. Accordingly, the transmittance T can be controlled electrically.

In this embodiment, an AC voltage signal waveform is applied simultaneously to the X electrode 6 and the Y electrode 7 as an AC waveform in which the polar character is changed on every ½ period, and the voltage which is applied to the X electrode 6 and the Y electrode 7 is $\pm V_{ON}$. Since the AC waveform changing the polar character on ½ period is applied to the X electrode 6 and the Y electrode 7 simultaneously, a circuit element of low voltage endurance can be used.

When $V_{ON}$ is low, the orientation state is at random due to Brownian motion. And most of incident light 30 cannot transmit through the liquid suspension 9 and is blocked since the incident light on the suspended particle device 1 is absorbed or scattered.

In the light-control state shown in FIG. 8, an AC voltage signal at a frequency $f_{ON}$ and at a voltage $V_{ON}$ is applied to the X electrode 6. In this embodiment, the AC voltage signal waveform is rectangular but it may be an AC waveform including a sinusoidal wave or a triangular wave. Further, an AC voltage signal may be applied for driving to one of the X electrode 6 and the Y electrode 7. $f_{ON}$ represents a value of frequency in a range where the light control particles 10 can conduct orientation operation uniformly with no aggregation or the like in the dispersion medium 11 and can maintain the orientation and the light-control state, which is determined depending on the concentration, dielectric constant, shape, affinity with the dispersion medium 11 of the light control particles 10, and the viscosity of the dispersion medium 11, etc. and this is preferably 1,000 Hz or less. Further, the frequency $f_{ON}$ is preferably at or higher than the critical flicker frequency (CFF) and at 16 Hz or higher and 1000 Hz or lower and, preferably, 50 Hz or higher and 1000 Hz or lower. In this embodiment, $f_{ON}$ and $V_{ON}$ are made constant, but $f_{ON}$ or $V_{ON}$ may be changed upon starting the light-control state.

In the patent specification, when it is described as "16 Hz or more, 1,000 Hz or less", this is identical with "16 Hz or higher and 1,000 Hz or less" and "16 to 1,000 Hz" also means the identical range.

For changing the driving state from the light-blocking state and the light-control state to the transmissive hold state, application of the voltage to the X electrode 6 and the Y electrode 7 is stopped. For increasing the aggregation rate of the light control particles 10 to the electrified body 8, a voltage may be applied to the X electrode 6 and the Y electrode 7.

Figure 9:
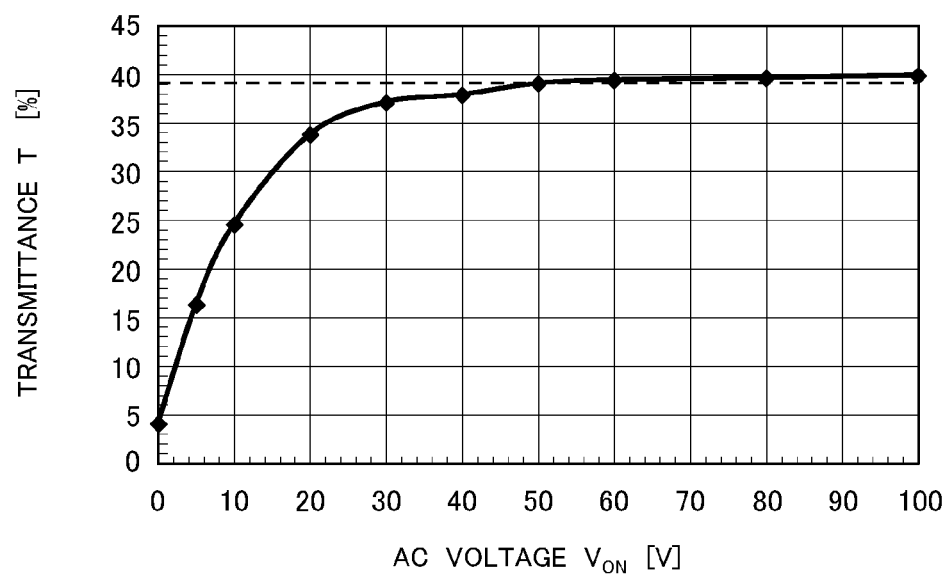
FIG. 9 is a graph showing transmittance T when AC voltage $VO_N$ is changed from 0 V to 100 V in the light-blocking state and the light-control state of the suspended particle device in FIG. 1 and FIG. 2.

FIG. 9 is a graph of transmittance T in the suspended particle device 1 of this embodiment when setting the frequency $f_{ON}$ in the light-control state to 100 Hz and varying the AC voltage $V_{ON}$ from 0 V to 100 V between the X electrode 6 and the Y electrode 7. The AC voltage $V_{ON}$ is expressed on the abscissa and the transmittance T is expressed on the ordinate. The transmittance T at the AC voltage $V_{ON}$ of 0 V is a transmittance just after dispersion of the light control particles 10 in the dispersion medium 11 from the transmissive hold state, which is the lowest transmittance of the suspended particle device 1 in the light-control state. The transmittance of the suspended particle device 1 in the transmissive hold state is 39%, which is shown by a broken line in FIG. 9.

As shown in the graph, in the suspended particle device 1 of this embodiment, the transmittance T increases along with increase in the voltage $V_{ON}$ and the transmittance T changes from 4 to 40% when the voltage $V_{ON}$ is controlled from 0 V to 100V. As a result, it can be seen that a predetermined transmissive state and a light-blocking state can be achieved by controlling the voltage $V_{ON}$.

As described above, this embodiment can achieve a uniform light-control state in an optical operation region of the suspended particles device 1, switching of the state to the transmissive hold state in a state of not applying the voltage and holding of the transmissive state.

Modified Example 1

FIG. 5, FIG. 6, and FIG. 7A to FIG. 7C show states in which the width of the Y electrode 7 is made equal with the width of the electrified body 8.

Figure 7A:
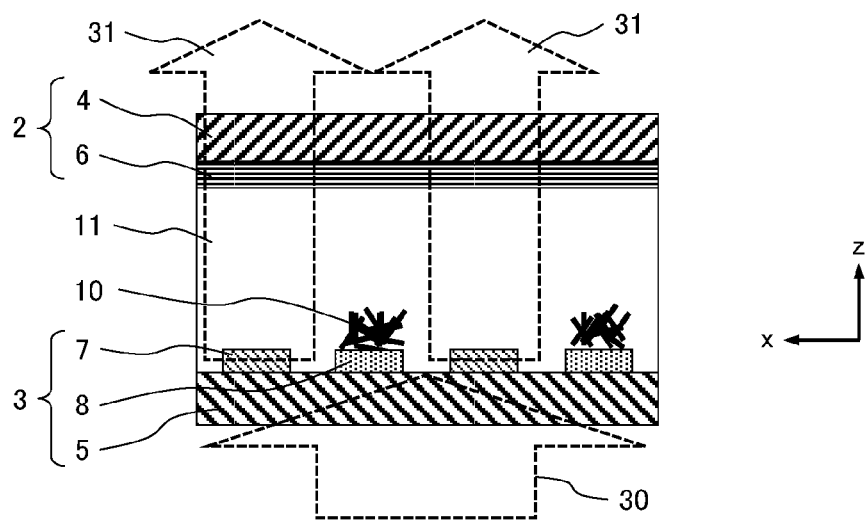
FIG. 7A is a fragmentary cross sectional view of a suspended particle device in FIG. 5 and FIG. 6 illustrating the state of light control particles and the optical path of incident light in a transmissive hold state.
Figure 7B:
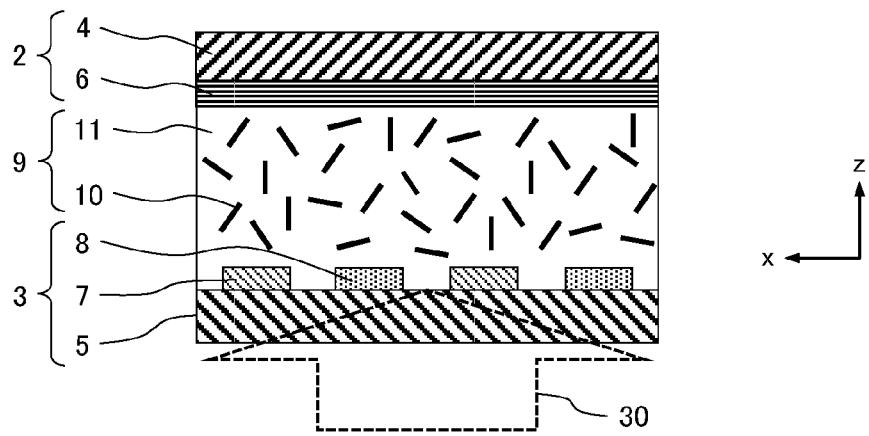
FIG. 7B is a fragmentary cross sectional view of the suspended particle device in FIG. 5 and FIG. 6 illustrating the state of light control particles and the optical path of the incident light in a light-control state at low transmittance.
Figure 7C:
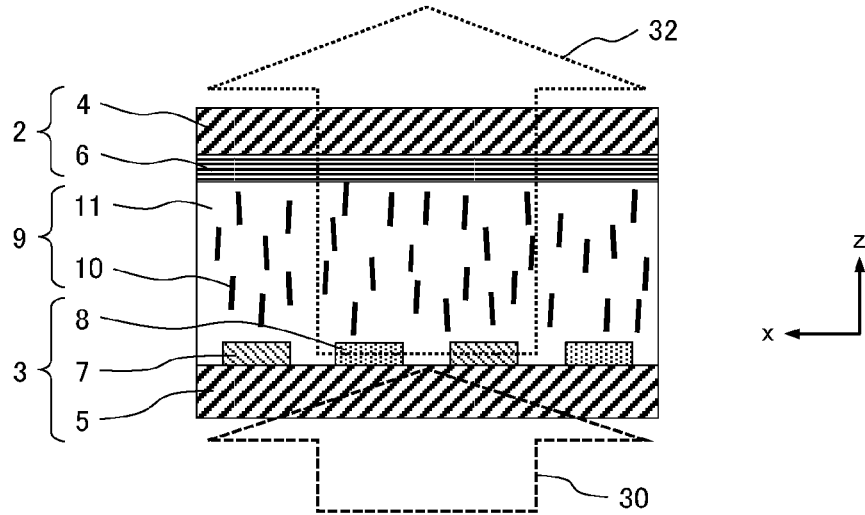
FIG. 7C is a fragmentary cross sectional view of the suspended particle device of FIG. 5 and FIG. 6 illustrating the state of light control particles and the optical path of incident light in a light-control state at high transmittance.

As shown in FIG. 7A, an aggregation portion of the light control particles 10 in the transmissive hold state can be dispersed.

Modified Example 2

Figure 30:
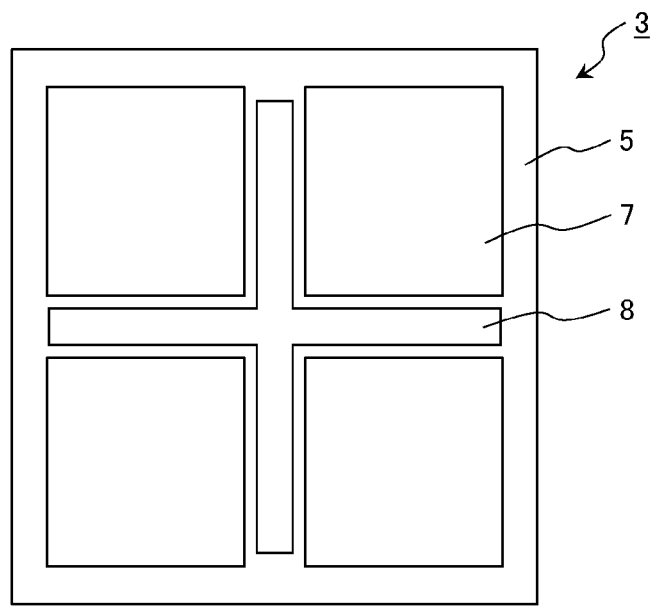
FIG. 30 is an upper view illustrating a modified example of a second plate member of the suspended particle device of FIG. 1.
Figure 31:
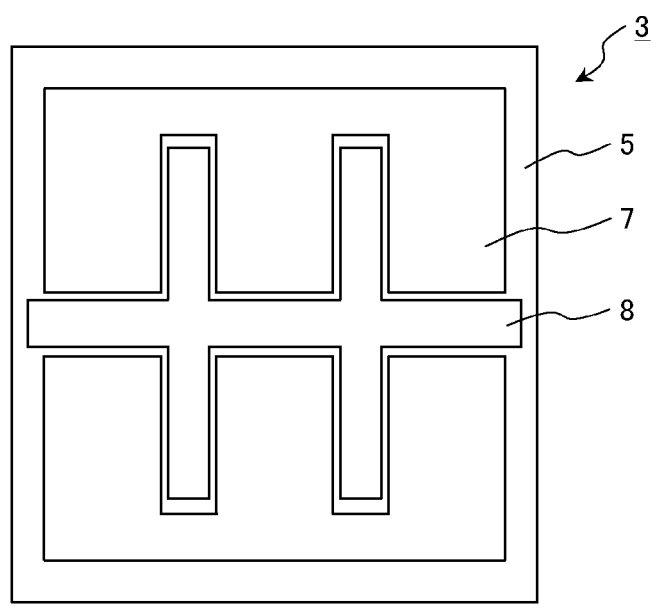
FIG. 31 is an upper view illustrating another modified example of a second plate member of the suspended particle device of FIG. 1.

FIG. 30 and FIG. 31 are upper plan views showing modified examples of a second plate member of the suspended particle device in FIG. 1.

In FIG. 30, a second plate member 3 has a plurality of rectangular Y electrodes 7 arranged at a pitch on the surface of a second substrate 5, and a cross-form electrified body 8 is disposed between each of them.

Further, in a second plate member 3 in FIG. 31, two Y electrodes 7 each having a concave portion are arranged on the surface in which an electrified body 8 in the form of a double crosspiece cross (Japanese character "え") is disposed between them.

The electrified body 8 shown in the drawings can shorten the mean value of the distance from the light control particles dispersed in the liquid suspension. Therefore, the aggregation speed of the light control particles can be increased.

Second Embodiment

The configuration of the suspended particle device 1 of this embodiment is basically identical with that of the first embodiment. In this embodiment, the average of the AC voltage signals (central voltage) applied on the X electrode 6 and the Y electrode 7 in the light-control state is higher than the reference potential by the surface potential $V_c$ of the electrified body 8 and has the same polar character. Descriptions of other driving conditions where they are identical with those of the first embodiment are to be omitted.

Figure 10:
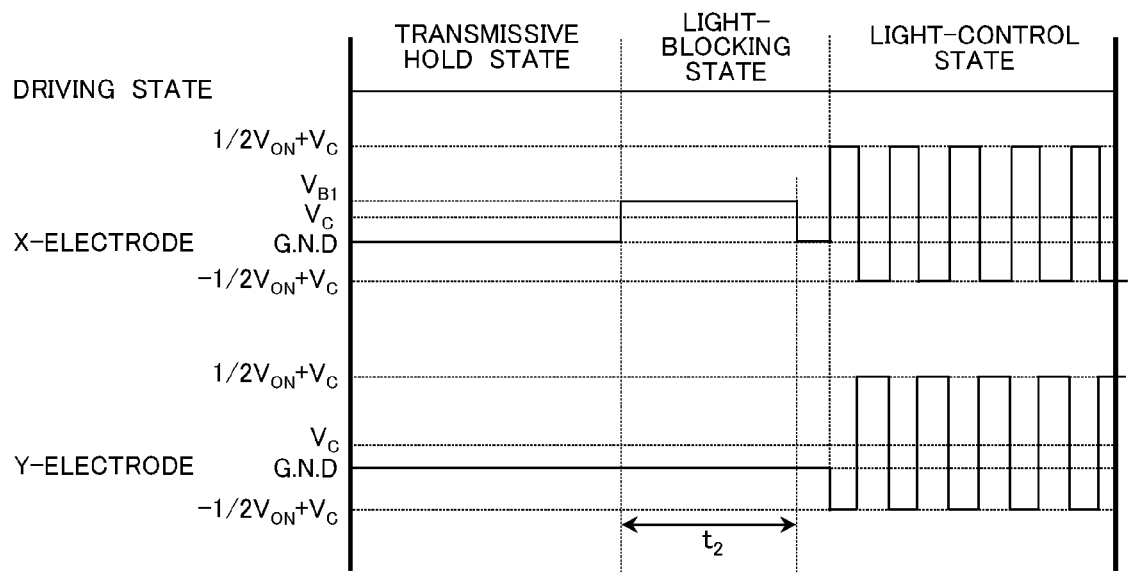
FIG. 10 is a graph showing a driving waveform from the transmissive hold state by way of the light-blocking state to the light-control state in the control of the light control device of the first embodiment.

FIG. 10 shows a driving waveform in the light-control state.

In this embodiment, an AC voltage signal waveform with the polar character being changed on every ½ period is applied as an AC waveform to the X electrode 6 and the Y electrode 7 simultaneously as in the first embodiment in which each voltage applied to the X electrode 6 and the Y electrode 7 is $\pm V_{ON}/2 + V_c$. In this embodiment, the AC voltage signal waveform is a rectangular waveform but it may be a sinusoidal or triangular AC waveform. Further, an AC voltage signal may be applied to one of the X electrode 6 and the Y electrode 7 and a DC voltage may be applied to the other of them for driving.

Figure 11:
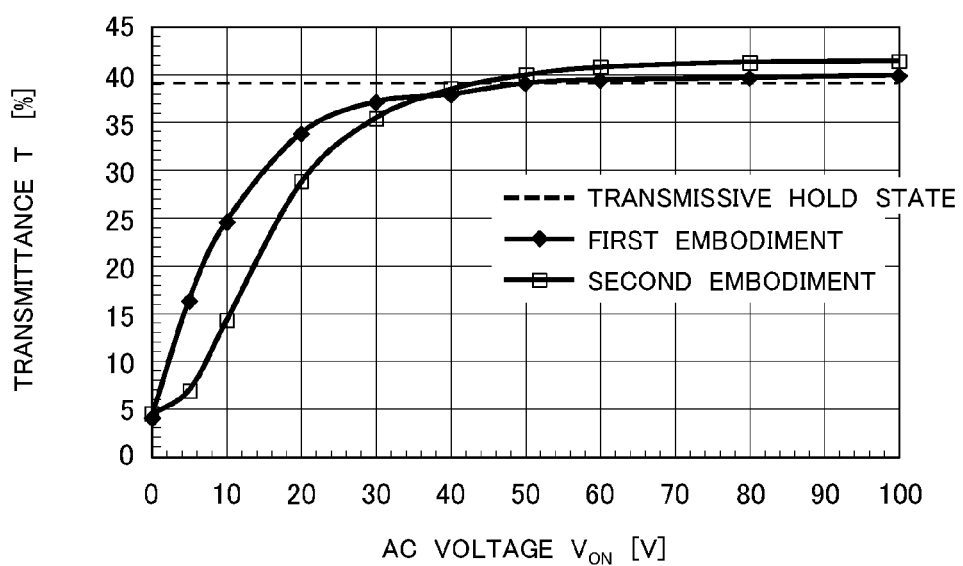
FIG. 11 is a graph showing transmittance T when AC voltage $V_{ON}$ in the light-blocking state and the light-control state of the suspended particle device in FIG. 1

FIG. 11 is a graph of transmittance T in the suspended particle device 1 of this embodiment when setting the frequency $f_{ON}$ in the light-control state to 100 Hz and changing the AC voltage $V_{ON}$ from 0 V to 100 V between the X electrode 6 and the Y electrode 7. The surface potential $V_c$ of the electrified body 8 is 15 V and the central voltage of the AC voltage signal waveform applied between the X electrode 6 and the Y electrode 7 is higher by 15 V than the reference potential G.N.D. The transmittance T at the AC voltage $V_{ON}$ of 0 V is a transmittance just after dispersion of the light control particles 10 in the dispersion medium 11 from the transmissive hold state as in the first embodiment which is the lowest transmittance of the suspended particle device 1 in the light-control state. Further, the transmittance of the suspended particle device 1 in the transmissive hold state is 39%, which is shown by a broken line in the same manner as in FIG. 9.

In the driving waveform of this embodiment, the central voltage of the AC voltage signal waveform applied to the X electrode 6 and the Y electrode 7 is higher by 15 V than the reference potential G.N.D. Accordingly, as shown in FIG. 11, when the device is driven at a low $V_{ON}$ voltage of 10 to 30 V, aggregation of the light control particles 10 to the electrified body 8 can be suppressed and the light-control state at low transmittance can be controlled and maintained more stably than that in the first embodiment.

In view of the above, according to this embodiment, movement of the light control particles 10 to the electrified body 8 can be suppressed during driving in the light-control state driving at a low voltage to obtain a stable light-control state at low transmittance.

Third Embodiment

The configuration of the first plate member 2 of the suspended particle device 1 of this embodiment is basically identical with that of the first plate member 2 of the first embodiment. In this embodiment, the position of disposing the Y electrode 7 and electrified body 8, and the structure of the second plate member 3 are different from those of the first embodiment. Descriptions for other configuration where they are identical with those of the first embodiment are to be omitted.

Figure 12:
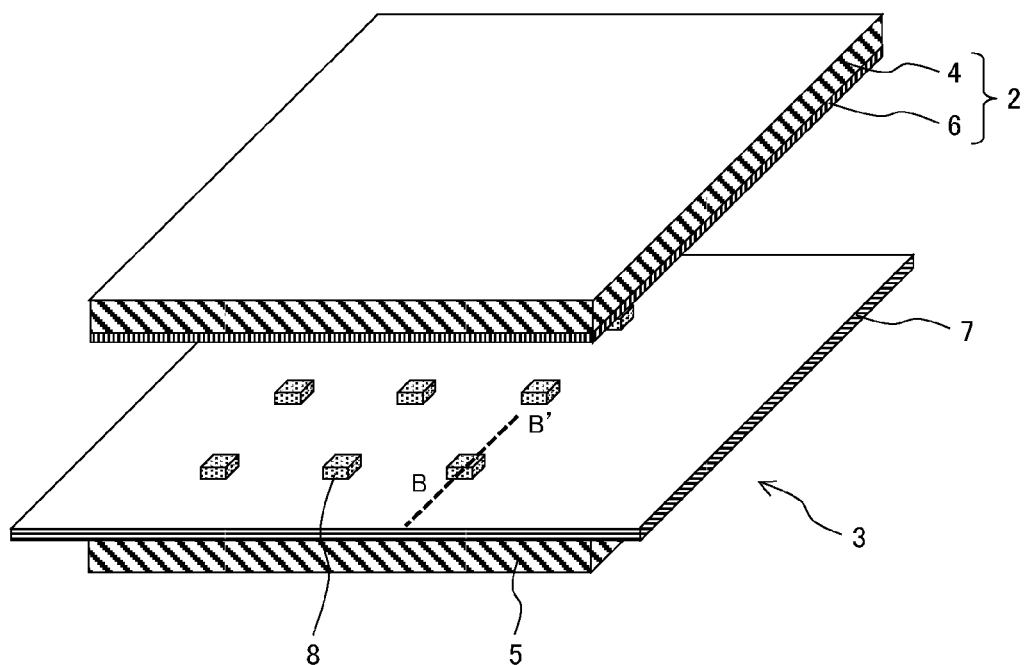
FIG. 12 is an exploded perspective view illustrating a configuration of a suspended particle device in a third embodiment.
Figure 12:
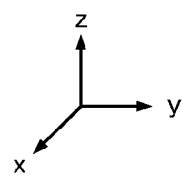
Figure 13:
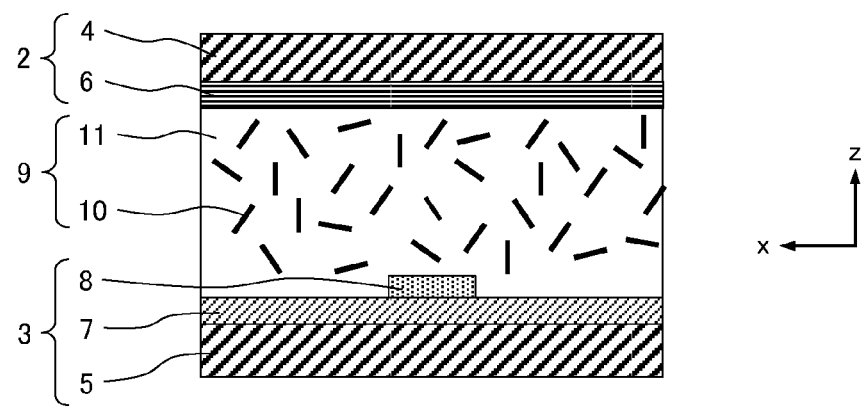
FIG. 13 is a fragmentary cross sectional view along plane x-z containing a sectional line B-B' in FIG. 12 of the suspended particle device after assembling.

FIG. 12 is an exploded perspective view of a suspended particle device 1 investigated by the present inventors. FIG. 13 illustrates a suspended particle device after assembling, as a cross sectional view along a plane x-z containing a sectional line B-B' in FIG. 12.

In a second plate member 3, narrow width electrified bodies 8 are arranged dotwise in a plane x-y to the surface of a second substrate 5 which is a transparent supporting base formed of a glass. The shape of the electrified body 8 is not restricted to a square columnar shape illustrated in FIG. 12 but may be a circular columnar shape, a polygonal columnar shape, or a columnar member of a geometrical pattern in a plan view.

Further, the electrified bodies 8 are preferably arranged regularly each at an equal distance in view of the amount of aggregation of the light control particles 10 in the transmissive hold state and so as to make the DC electric field between the X electrode 6 and the electrified body 8 substantially uniform upon change from the transmissive hold state to the light-control state. The electrified bodies 8 may be arranged in a character type or geometrical pattern, so that the character type or geometrical pattern can be visually recognized by the electrified bodies 8 and the light control particle 10 in the aggregated state by controlling the size of the electrified bodies 8 and the amount of aggregation of the optical control particles 10 to the electrified bodies 8.

The electrified bodies 8 are an electret, which is obtained by disposing an organic polymer on the Y electrode 7, then heat melting the organic polymer, forming a DC electric field to the organic polymer by using the Y electrode 7 thereby polarizing the polymer and, subsequently, cooling and solidifying the molten polymer while maintaining the polarization state. The method of disposing the organic polymer includes, for example, a printing method such as screen printing, inkjet printing, etc. or photolithography, which may be selected depending on the kind of the materials. Further, the polar character of the electrified body 8 and the electret at the surface in contact with the liquid suspension 9 is positive.

The electrified bodies 8 of this embodiment are smaller than those of the first embodiment in the ratio of area to the Y electrode 7 and the light control operation region. Hence, the visibility of the electrified body 8 to which the light control particles 10 are aggregated and localized in the light-control operation region of the suspended particle device 1 is lowered than that in the first embodiment, and a transmissive hold state which is more uniform and at higher transmittance can be obtained. Further, for the arrangement of the electrified bodies 8, they are formed directly by using the Y electrode 7 in this embodiment, so that the adhesion step can be saved and control of the charged state such as the polar character can be facilitated, and the productivity is also improved.

Fourth Embodiment

The configuration of a first plate member 2 of a suspended particle device 1 of this embodiment is basically identical with that of the suspended particle device 1 of the first embodiment. This embodiment is different from the first embodiment in that stripe like ribs 25 are formed to a second plate member 3, so that the X electrode 6 and the Y electrode 7 are divided. Descriptions for other configurations where they are identical with those of the first or third embodiment are to be omitted.

Figure 14:
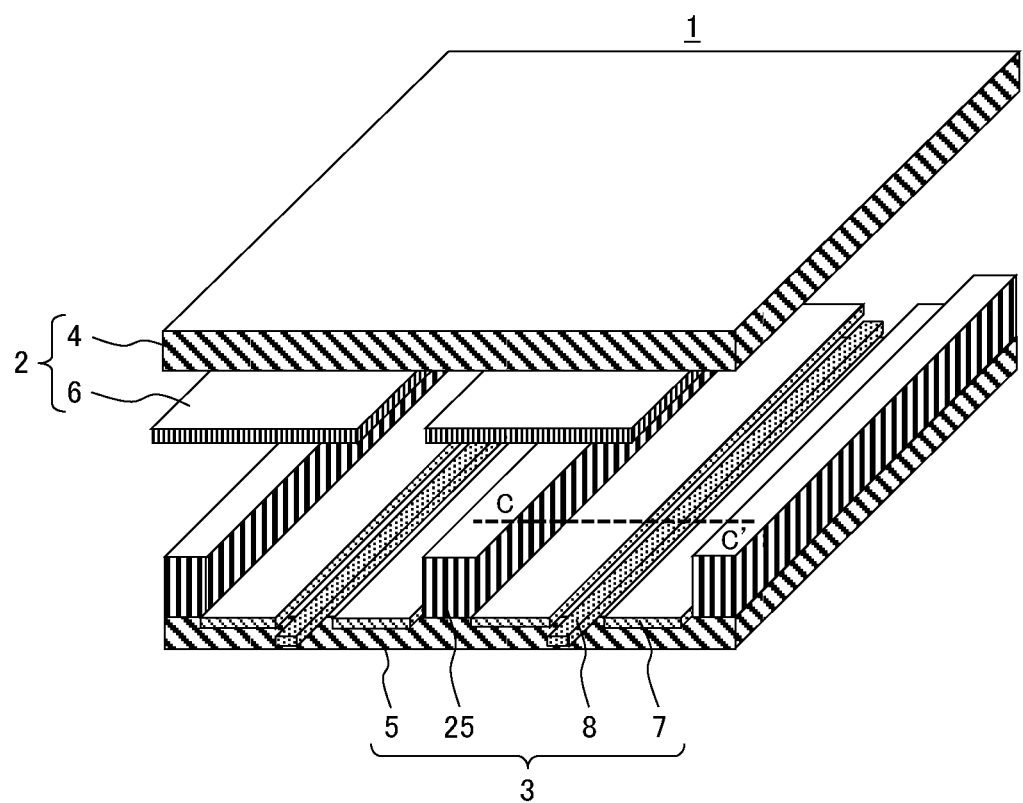
FIG. 14 is an exploded perspective view illustrating a configuration of a suspended particle device of a fourth embodiment.
Figure 14:
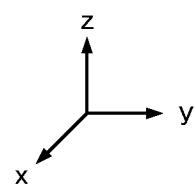
Figure 15A:
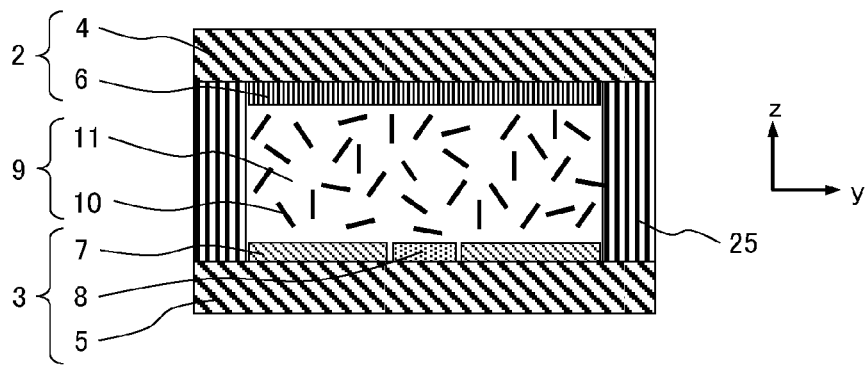
FIG. 15A is a fragmentary cross sectional view of the suspended particle device after assembling along a plane y-z containing a sectional line C-C' in FIG. 14.
Figure 15B:
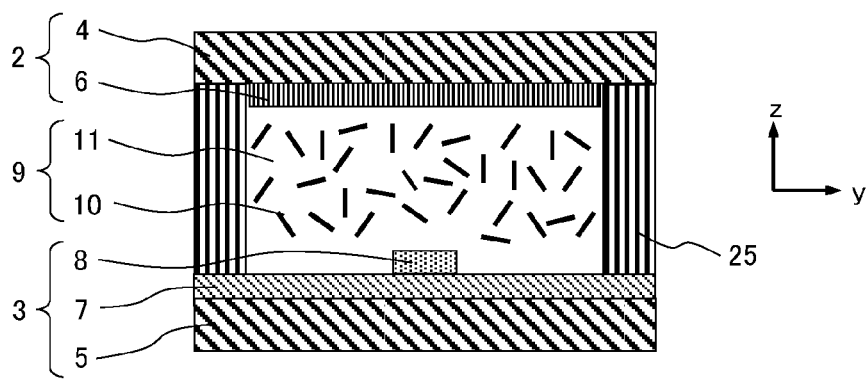
FIG. 15B is a fragmentary cross sectional view illustrating a modified example of FIG. 15A.
Figure 15C:
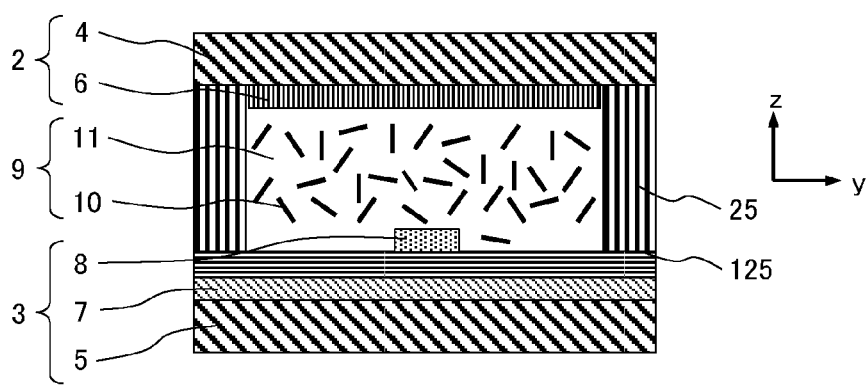
FIG. 15C is a fragmentary cross sectional view illustrating another modified example of FIG. 15A.

FIG. 14 is an exploded perspective view of a suspended particle device 1 investigated by the present inventors. FIG. 15A to FIG. 15C illustrate a suspended particle device after assembling, as cross sectional views along a plane y-z containing a sectional line C-C' in FIG. 14.

In a second plate member 3, a Y electrode 7 and an electrified body 8 having a width in the direction of the axis y narrower than that of the Y electrode 7 are formed in a stripe pattern on the surface of a second substrate 5 which is a transparent supporting base formed of the glass. Further, on the surface of the second substrate 5, stripe-like ribs 25 are formed each at an equal distance on the surface of the second substrate 5 in order to divide the space for filling the liquid suspension and maintain the space for filling the liquid suspension and the distance between the first plate member 2 and the second plate member 3. The Y electrode 7 and electrified body 8 are disposed between ribs 25 adjacent to each other. In FIG. 15A, the ribs 25 are joined to the second substrate 5. The rib 25 is preferably formed of a material of highly electrically insulating property.

The ribs 25 are formed by photolithography or screen printing, disposing a resin film having apertural areas of a predetermined shape by punching or the like, or using a dispersion medium 11 containing an energy beam-curable polymer medium and a photopolymerization initiator and irradiating the liquid suspension 9 selectively with an energy beam while shielding portions other than the rib formation portion thereby curing the same.

The X electrode of the first plate member 2 are formed each at an equal distance so as to be in parallel with the rib 25 of the second plate member 3 and so as to be situated between the stripe-like ribs 25.

In this embodiment, a driving state such as an orientation state of the light control particles 10 can be controlled independently on every space partitioned by the ribs 25.

For lowering the transmittance in the light-blocking state, at least the top portion of the rib 25 may be pigmented black or may be pigmented to other colors for color correction. Further, for ensuring a large area for each light control operation, the width of the rib 25 is preferably narrow and, further, it is preferably narrower than the width of the two Y electrodes 7 disposed between the ribs 25. More preferably, the width of the rib 25 is narrower than the width of the electrified body 8.

Further, as a modified example, the rib 25 is joined to the surface of the Y electrode 7 in FIG. 15B. In FIG. 15C, the rib 25 is joined to the surface of a dielectric layer 125 formed so as to cover the Y electrode 7. In this embodiment, the rib 25 is formed on the surface of the Y electrode 7 or on the surface of the dielectric layer 125, but it may be formed on the surface of the second substrate 5. Also for the X electrodes 6, while they are disposed between the ribs 25 but they may be disposed so as to be in contact with the ribs 25.

Further, in this embodiment, the ribs 25 are formed in parallel with the Y electrode 7 and the electrified body 8, but the ribs 25 also may be formed so as to orthogonally or obliquely intersect the Y electrode 7 and the electrified body 8, or may be formed as a surrounding box-type having parallel or perpendicular ribs combination, circular shape, or a polygonal shape such as a honeycomb structure. Further, the shape and the direction of arranging each of the electrodes and the electrified bodies 8 may be changed depending on the structure and the shape of the rib 25 or the region selective driving to be described later.

Figure 16:
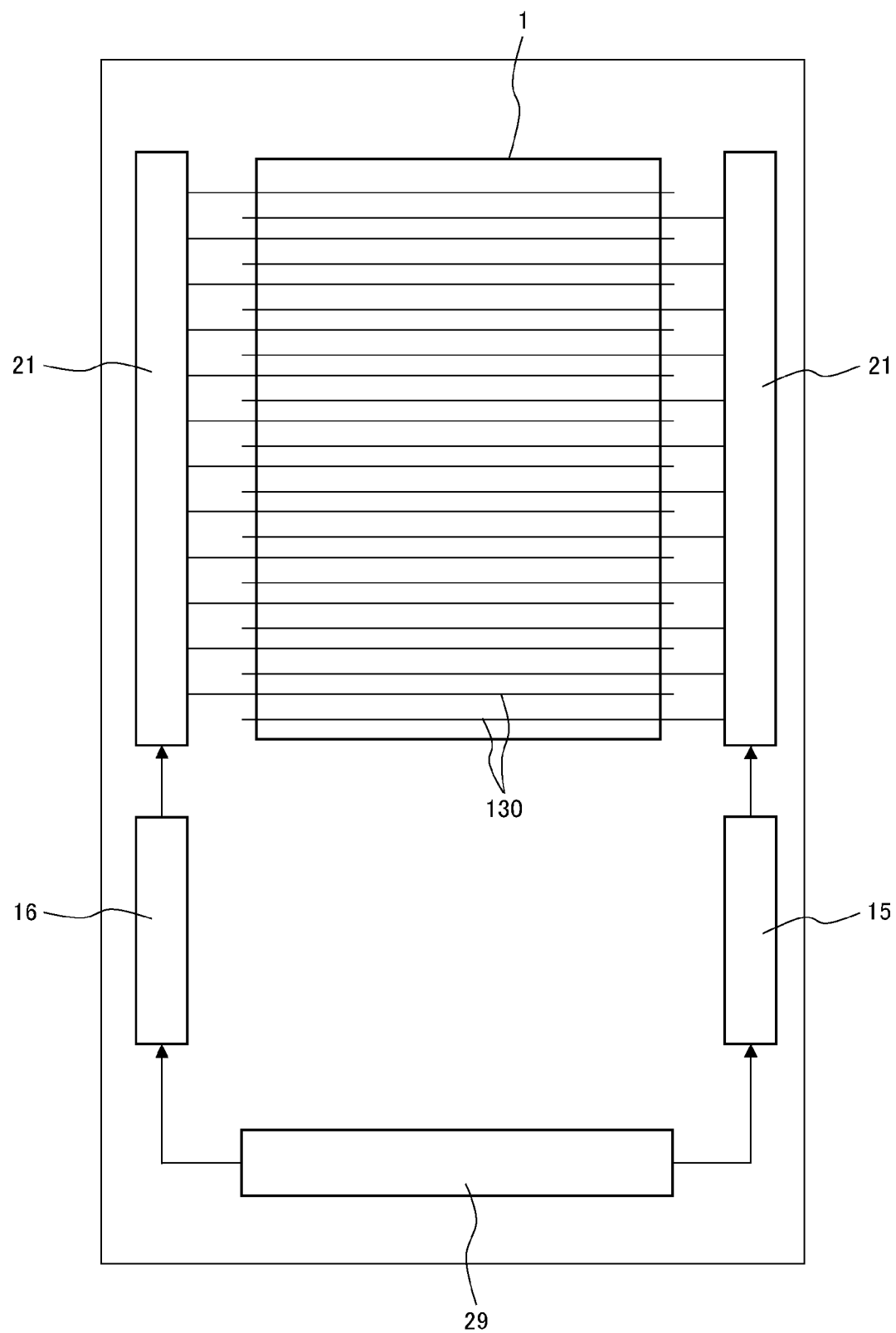
FIG. 16 is a block diagram showing a configuration of a light control device using a suspended particle device of the fourth embodiment.

FIG. 16 is a block diagram showing a configuration including a suspended particle device and a selection circuit.

In the drawing, electrodes 130 are connected to a selection circuit 29 by way of interconnecting conductors 21, and one of an X electrode output circuit 15 and a Y electrode output circuit 16 to the selection circuit 29. The selection circuit 29 is a circuit for outputting a signal to the X electrode output circuit 15 and the Y electrode output circuit 16 so as to select one of the plurality of X electrodes 6 and Y electrodes 7 to which a driving voltage is applied.

In this embodiment, a flexible printed circuit having lead terminals by the number corresponding to that of the X-electrodes 6 and the Y-electrodes 7 in the suspended particle device 1, and capable of applying a driving voltage on every electrode 130 while preventing shortage to adjacent electrodes 130 is used for the interconnecting conductors 21 between the X-electrode 6 and the X electrode output circuit 15 and between the Y electrode 7 and the Y electrode output circuit 16. The selection circuit 29 may be connected only between the driving control circuit 18 and the X electrode output circuit 15. Further, the Y electrode 7 may have an identical electrode structure in which the electrode is connected to one wiring between the suspended particle device 1 and the Y electrode output circuit 16.

According to the suspended particle device 1 of this embodiment, the X electrode 6 and the Y electrode 7 to which the AC voltage $V_{ON}$ is applied in the suspended particle device 1 can be selected by the selection circuit 29 of FIG. 16 and light control operation which is different on every region between the ribs 25 can be achieved within the optical operation region of the suspended particle device 1.

Fifth Embodiment

The configuration of the first plate member 2 of the suspended particle device 1 of this embodiment is basically identical with that of the suspended particle device 1 of the first embodiment. This embodiment is different from the first to fourth embodiments in that the Y electrode 7 and electrified bodies 8 are covered with a dielectric layer 24 and apertures (apertural area) are partially formed to the dielectric layer 24. The electrified body 8 is exposed from the aperture. Description for other configurations where they are identical with those of the first, second, third, or fourth embodiment are to be omitted.

Figure 17:
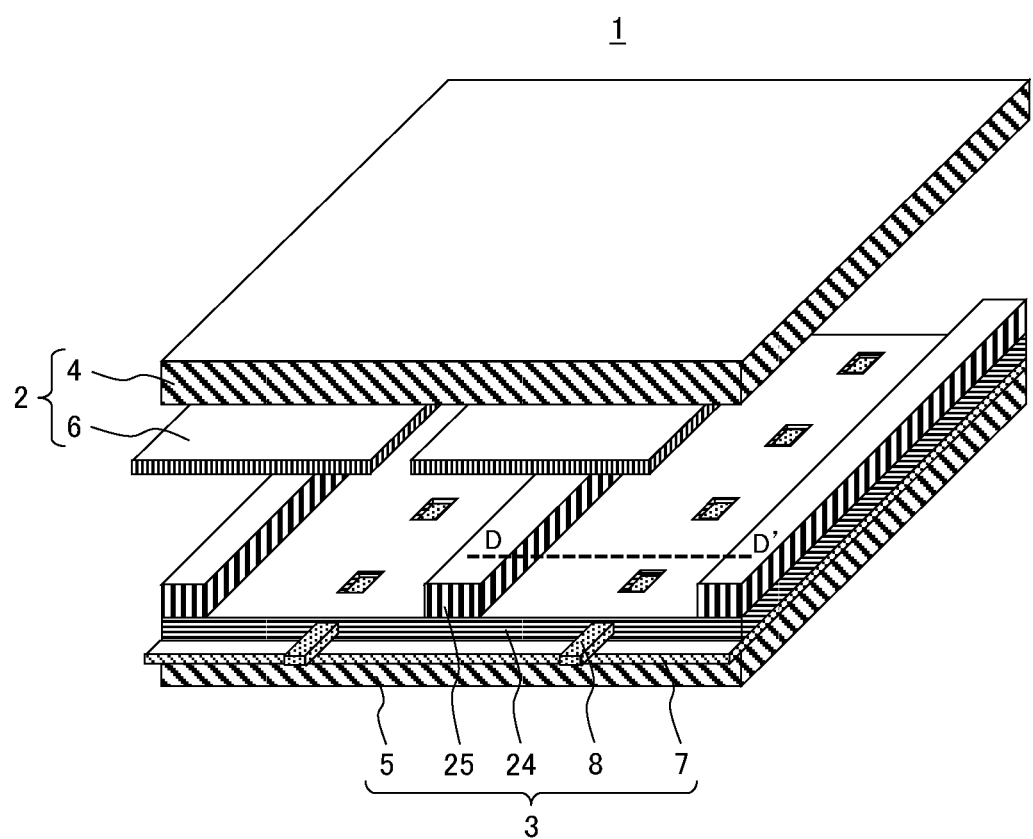
FIG. 17 is an exploded perspective view illustrating the configuration of a suspended particle device in a fifth embodiment.
Figure 18A:
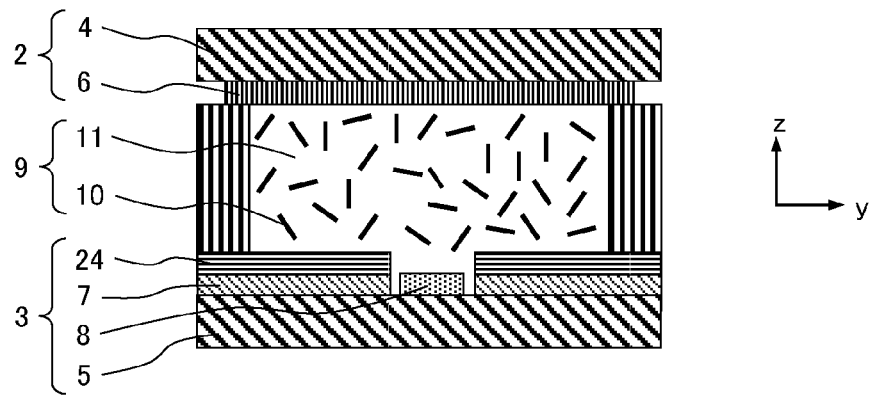
FIG. 18A is a fragmentary cross sectional view in a plane y-z containing a sectional line D-D' in FIG. 17 of the suspended particle device after assembling.
Figure 18B:
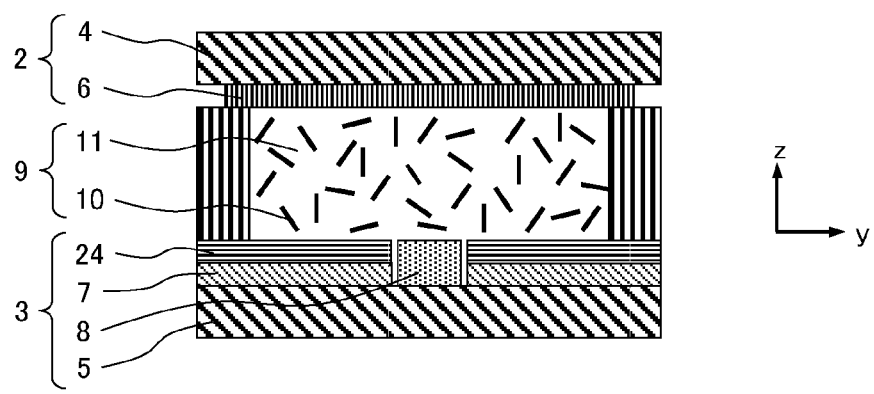
FIG. 18B is a fragmentary cross sectional view illustrating a modified example of FIG. 18A.
Figure 18C:
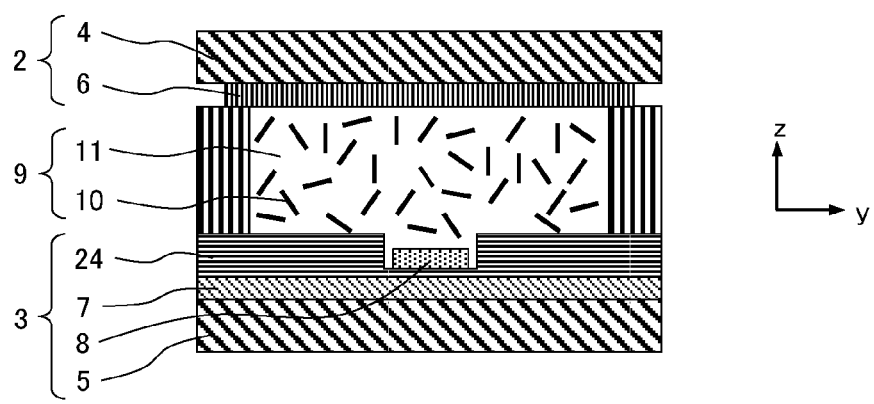
FIG. 18C is a fragmentary cross sectional view illustrating another modified example of FIG. 18A.

FIG. 17 is an exploded perspective view of a suspended particle device 1 investigated by the present inventors. FIG. 18A to FIG. 18C illustrate a suspended particle device after assembling as cross sectional views along a plane y-z containing a sectional line D-D'.

In a second plate member 3 in FIG. 17, a Y electrode 7 having an area identical with that of a second substrate 5 is disposed on the surface of the second substrate 5 which is a transparent supporting base formed of the glass, a dielectric layer 24 is disposed on the surface of the Y electrode 7, and electrified bodies 8 each having a narrow width in the direction of an axis y are arranged at a distance (in a stripe pattern) in the dielectric layer 24. That is, the electrified bodies 8 are covered with the dielectric layer 24. The dielectric layer 24 is transparent and has an electrically insulating property.

Ribs 25 are formed in a stripe pattern each at an equal distance on the surface of the dielectric layer 24 in order to provide a liquid suspension filling space. In this embodiment, the ribs 25 are formed on the surface of the dielectric layer 24, but they may be formed on the surface of the Y electrode 7 or the second electrode 5, or the surface of the electrified bodies 8. Apertures (apertural area) are formed in the dielectric layer and the electrified bodies 8 exposed from the apertures are in contact with the liquid suspension 9.

In the second plate member 3 illustrated in FIG. 18A, an electrified body 8 is joined at the surface of a second substrate 5 in which the height of the electrified body 8 is not more than the upper surface of the dielectric layer 24.

The second plate member 3 illustrated in FIG. 18B includes a second substrate 5 having an electrified body 8 joined to the surface thereof in which the height of the electrified body 8 is equal with the upper surface or not more than the upper surface of the dielectric layer 24.

In the second plate member 3 illustrated in FIG. 18C, a Y electrode 7 is formed on the surface of the second substrate 5, an insulating dielectric layer 24 is formed so as to cover the Y electrode 7, a concave portion is formed to the surface of the dielectric layer 24, an electrified body 8 is disposed in the concave portion thereof, then the electrified body 8 is further covered with the dielectric layer 24, and a portion of the electrified body 8 is partially exposed by forming an aperture in the dielectric layer 24.

In this embodiment, light control particles 10 are aggregated and localized in the aperture of the dielectric layer 24 and on the surface of the electrified body 8 of strong electric field intensity in contact with the liquid suspension 9 in the transmissive hold state.

Sixth Embodiment

The configuration of a first plate member 2 of a suspended particle device 1 of this embodiment is basically identical with that of the suspended particle device 1 of the first embodiment. The sixth embodiment is different from the fifth embodiment in that the Y electrode 7 is disposed so as to be exposed and in contact with the liquid suspension 9. Description for other configurations where they are identical with those of the first, second, third, fourth, and fifth embodiments are to be omitted.

Figure 19:
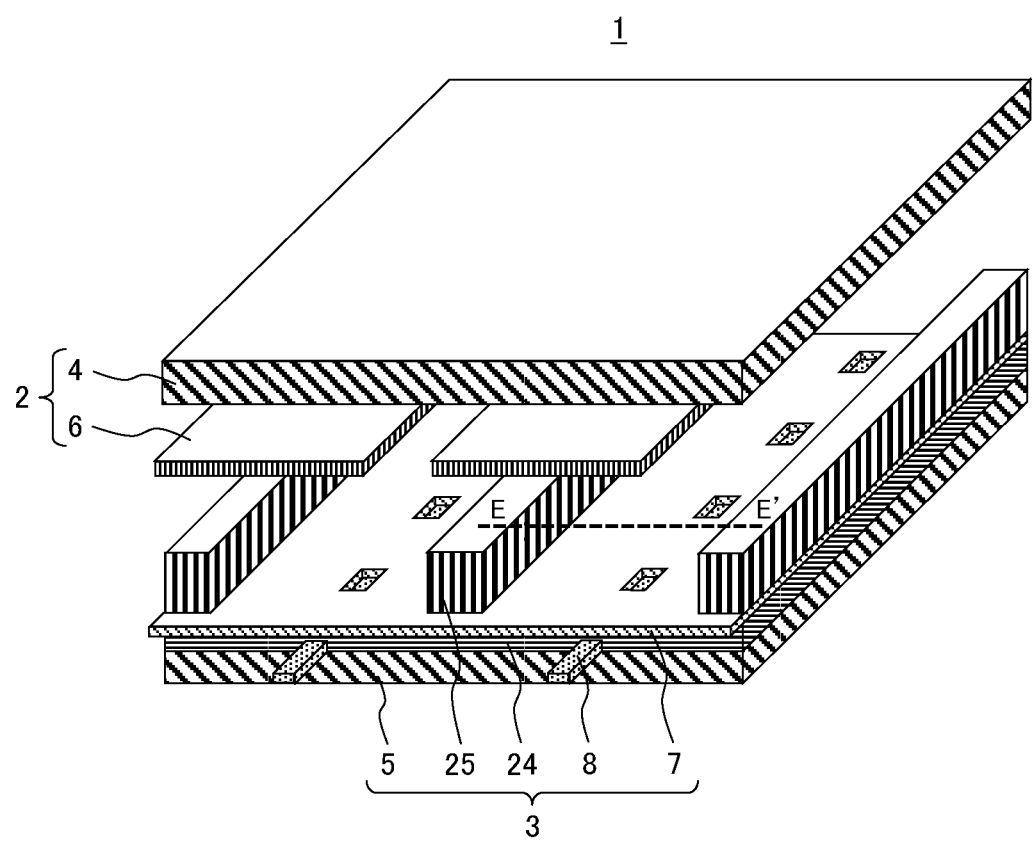
FIG. 19 is an exploded perspective view illustrating a configuration of a suspended particle device of a sixth embodiment.
Figure 20A:
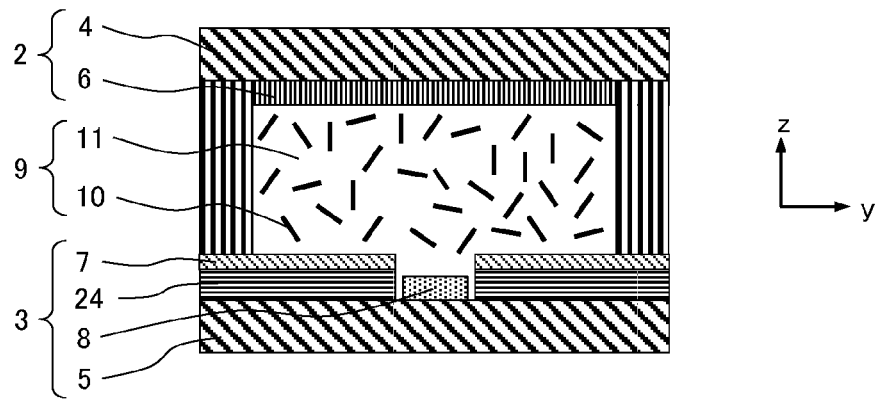
FIG. 20A is a fragmentary cross sectional view of the suspended particle device after assembling along a plane y-z containing a sectional line E-E' in FIG. 19.
Figure 20B:
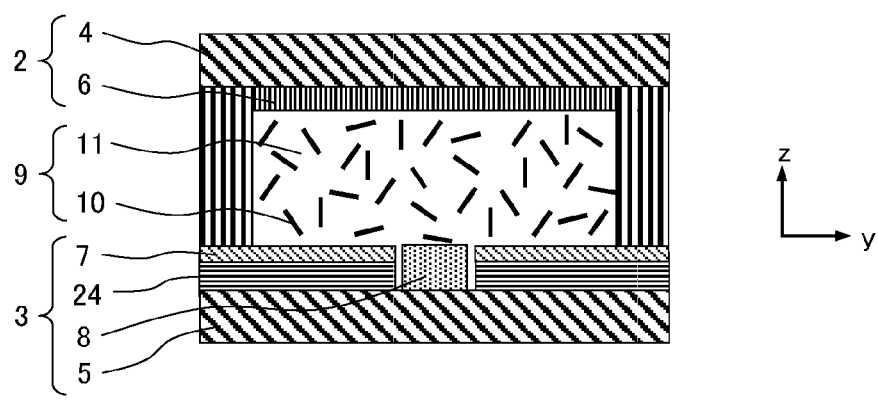
FIG. 20B is a fragmentary cross sectional view illustrating a modified example of FIG. 20A.
Figure 20C:
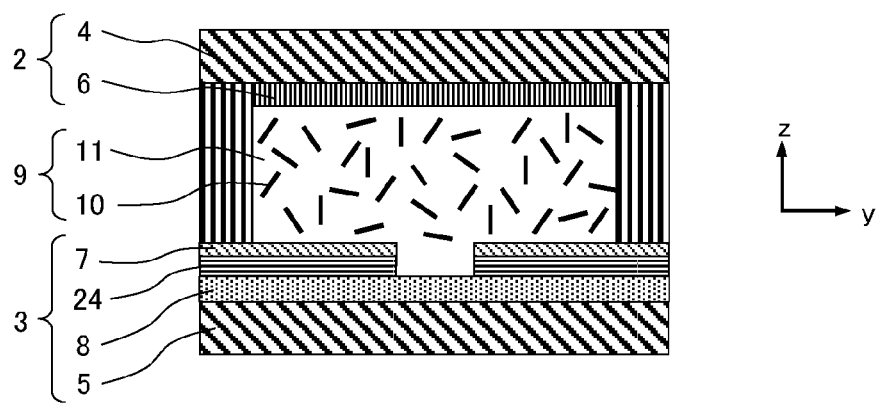
FIG. 20C is a fragmentary cross sectional view illustrating another modified example of FIG. 20A.

FIG. 19 is an exploded perspective view of a suspended particle device 1 investigated by the present inventors. FIG. 20A to FIG. 20C illustrate the suspended particle device after assembling as cross sectional views along a plane y-z containing a sectional line E-E' in FIG. 19.

In a second member 3 in FIG. 19, a dielectric layer 24 and electrified bodies 8 each having a width in the direction of an axis y narrower than that of the dielectric layer 24 disposed in a stripe pattern or dot pattern are formed on the surface of a second substrate 5 which is a transparent supporting base formed of the glass in which the dielectric layer 24 and the electrified bodies 8 are covered by Y electrode 7. Apertures (apertural areas) are formed partially in the Y electrode 7 and the dielectric layer 24 and the electrified bodies 8 exposed from the apertures are in contact with a liquid suspension 9.

In the second plate member 3 shown in FIG. 20A, the electrified bodies 8 are joined to the surface of the second substrate 5 and the height of the electrified body 8 is not more than the upper surface of the Y electrode 7.

In the second plate member 3 shown in FIG. 20B, an electrified body 8 is joined on the surface of a second substrate 5 in which the height of the electrified body 8 is identical with the upper surface or exceeds the upper surface of the Y electrode 7.

In a second plate member 3 shown in FIG. 20C, an electrified body 8 is formed on the surface of a second substrate 5, a dielectric layer 24 is formed so as to cover the electrified body 8, and a Y electrode 7 having an aperture (apertural area) is disposed on the surface of the dielectric layer 24 thereby partially exposing the electrified body 8 covered with the dielectric layer 24.

In this embodiment, the ratio of the area of the Y electrode 7 opposing the X electrode 6 is large. Hence a uniform light-control state can be obtained in an optical operation region of the suspended particle device 1 in a light-control state at high transmittance.

Seventh Embodiment

The configuration of a first plate member of a suspended particle device of this embodiment is basically identical with that of the suspended particle device of the first embodiment. This embodiment is different from the first to fifth embodiments in that electrode pairs each composed of a Y electrode and a Z electrode of a narrow width and an electrified body are disposed alternately and the electrified bodies are exposed to be in contact with the liquid suspension. The Z electrode is also referred to as "a third electrode".

Descriptions for other configurations where they are identical with those of the first to sixth embodiments are to be omitted.

(Suspended Particle Device)

Figure 21:
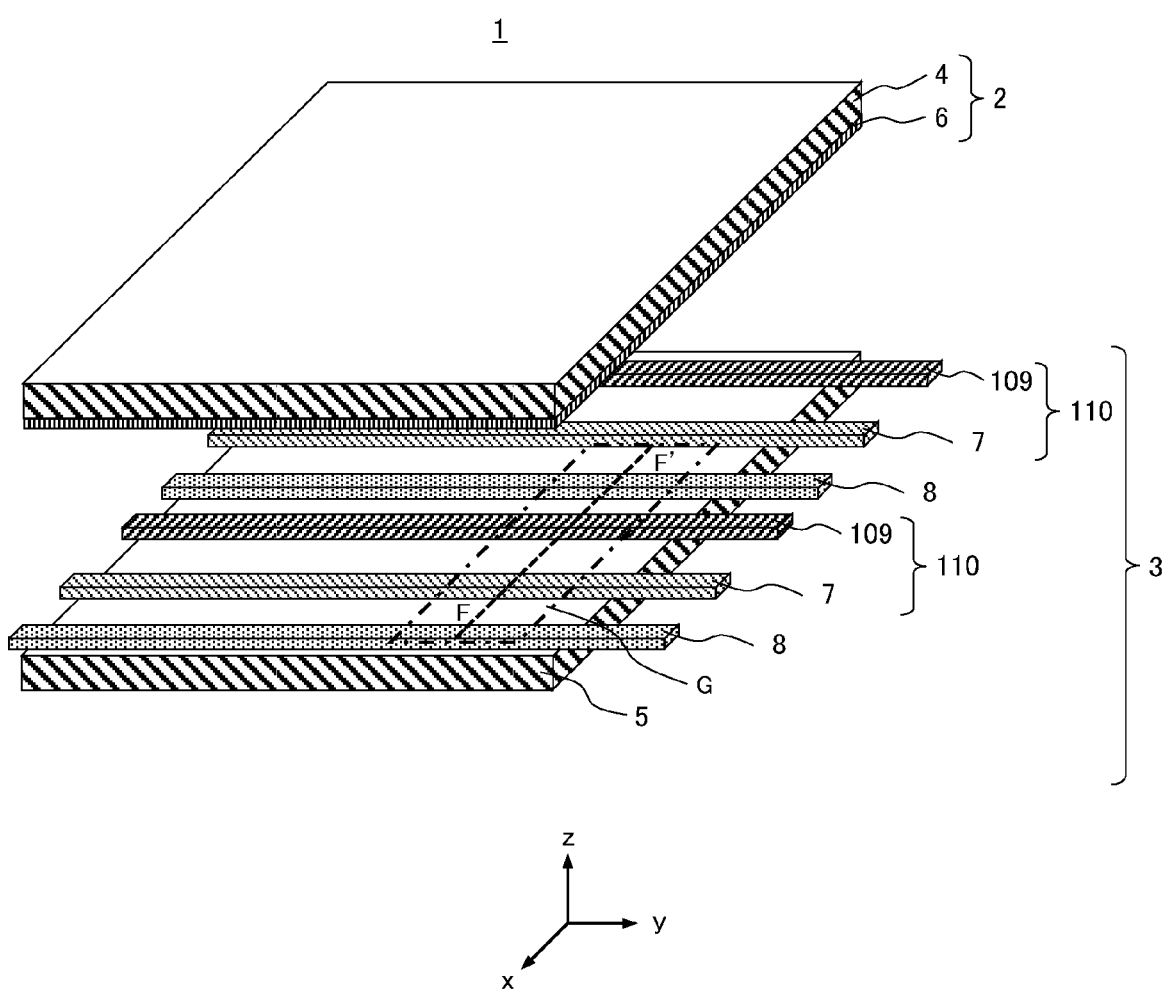
FIG. 21 is an exploded perspective view illustrating a configuration of a suspended particle device of a seventh embodiment.
Figure 22A:
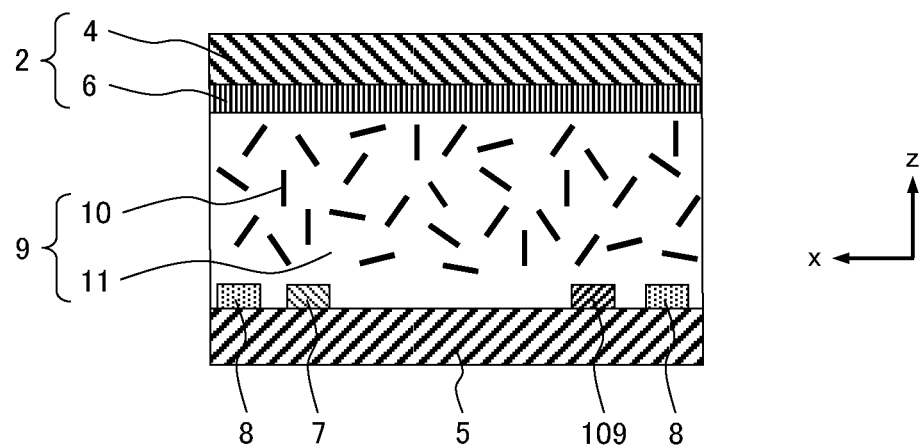
FIG. 22A is a fragmentary cross sectional view of the suspended particle device after assembling in a plane x-z containing a sectional line F-F' in FIG. 21.
Figure 22B:
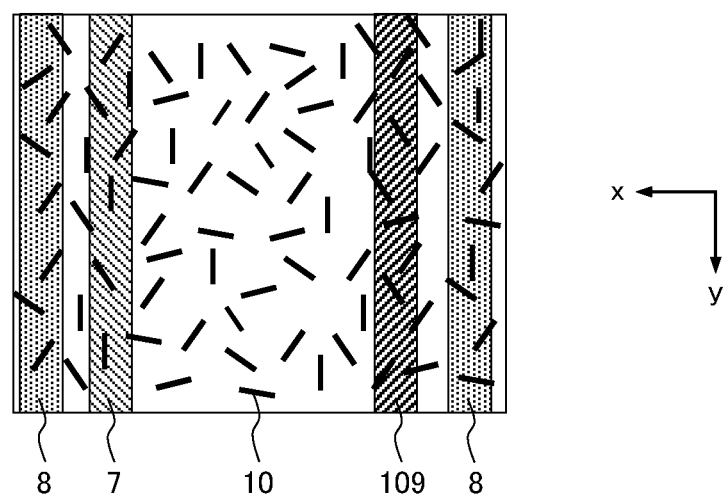
FIG. 22B is a plane x-y view for a portion surrounded by a dotted chain G in FIG. 21 as viewed on the side of a first plate member 2.

FIG. 21 is an exploded perspective view of a suspended particle device 1 investigated by the present inventors. FIG. 22A illustrates a suspended particle device after assembling as a cross sectional view along a plane x-z containing a sectional line F-F' in FIG. 21. FIG. 22B is a plan view along a plane x-y illustrating a portion surrounded by a dotted chain G on the side of a first plate member 2 in FIG. 21.

In a second plate member 3 in FIG. 21, electrode pairs 110 each composed of a Y electrode 7 and a Z-electrode 109 made of indium tin oxide (ITO) are disposed in a stripe pattern on the surface of a second substrate 5 which is a transparent supporting base formed of the glass. The width of the Y electrode 7 and the Z electrode 109 in the direction of the axis x is narrower than that of the first embodiment, the width of the Y electrode 7, the Z electrode 109, and the electrified body 8 in the direction of the axis x is preferably 10 µm or more and 100 µm or less in order to increase the transmittance in a transmissive hold state, and further preferably 10 µm or more and 50 µm or less in order to lower the visibility of the electrified body 8 and decrease the area of an electric field forming portion in the direction of an axis z above the Y electrode 7 and the electrified body 8, which is ineffective in a light-control state to be described later. The distance between the Y electrode 7 and the Z electrode 109 is 5 μm or more and 1,000 μm or less, which is determined depending on the electric characteristics such as resistivity and dielectric constant of constituent materials of the liquid suspension 9, size for other portions of the suspended particle device 1, use of a driving device 14, etc. The distance between the Y electrode 7 and the electrified body 8 and between the Z electrode 109 and the electrified body 8 (distance between the end of the Y electrode 7 and the end of the electrified body 8) in the direction of the axis x is 5 μm or more and 1,000 μm or less and, preferably, 10 μm or more and 1,000 μm or less. For suppressing increase in the driving voltage, the distance is preferably 5 μm or more and 1,000 μm or less and, more preferably, 10 μm or more and 300 μm or less.

Further, in this embodiment, while the Y electrode 7 and the Z electrode 109 are formed of indium tin oxide, they may be formed of transparent conductors such as indium zinc oxide (IZO), tin oxide, zinc oxide, carbon nanotube, graphene, etc. Further, the Y electrode 7 and the Z electrode 109 may be formed of a mono-layer film or a stacked film of a metal such as chromium, copper, aluminum and silver or an alloy thereof, or a micro fine wire of a metal such as copper or a copper alloy. In this embodiment, the X electrode 6 is formed uniformly on the surface of the first substrate 4. While the Y electrode 7 and the Z electrode 109 and the electrified body 8 are disposed in a stripe pattern, this is not restrictive but they may be disposed so as to form a circular pattern or a letter shape.

(Method of Driving Suspended Particle Device)

Then, a driving method of this embodiment is to be described.

Figure 23A:
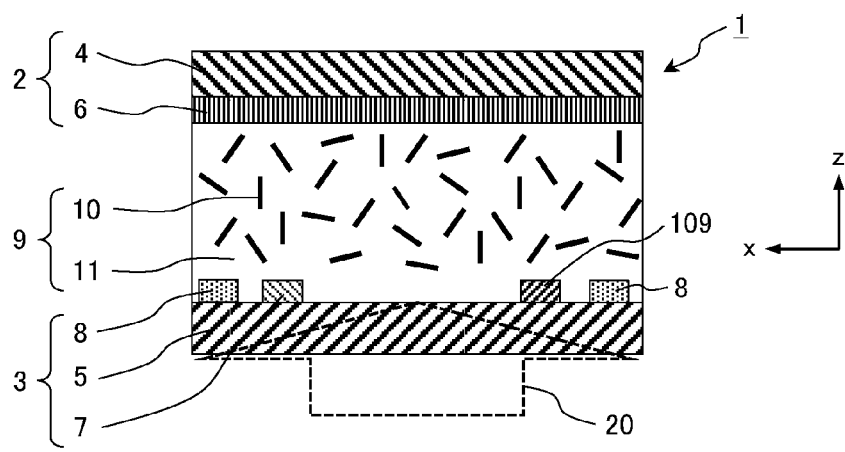
FIG. 23A is a fragmentary cross sectional view of a suspended particle device after assembling (light-blocking state) on a plane x-z containing a cross sectional line F-F' in FIG. 21.
Figure 23B:
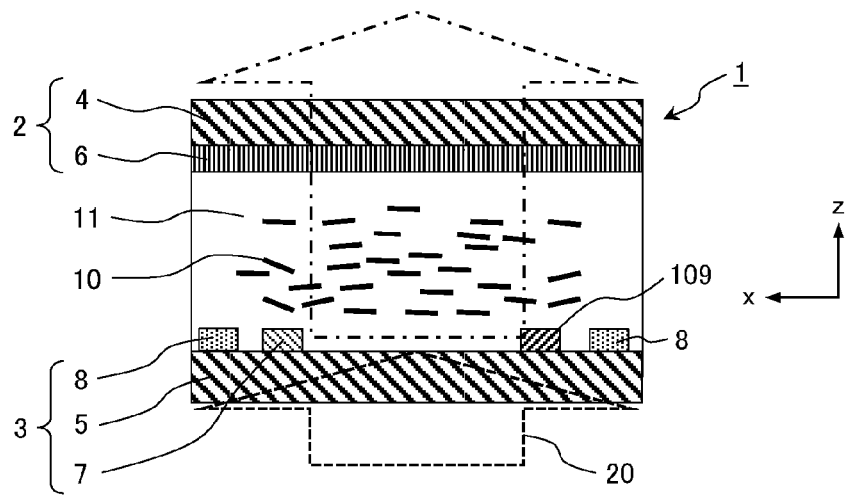
FIG. 23B is a fragmentary cross sectional view of a suspended particle device after assembling (light-control state) on a plane x-z containing a cross sectional line F-F' in FIG. 21.
Figure 23C:
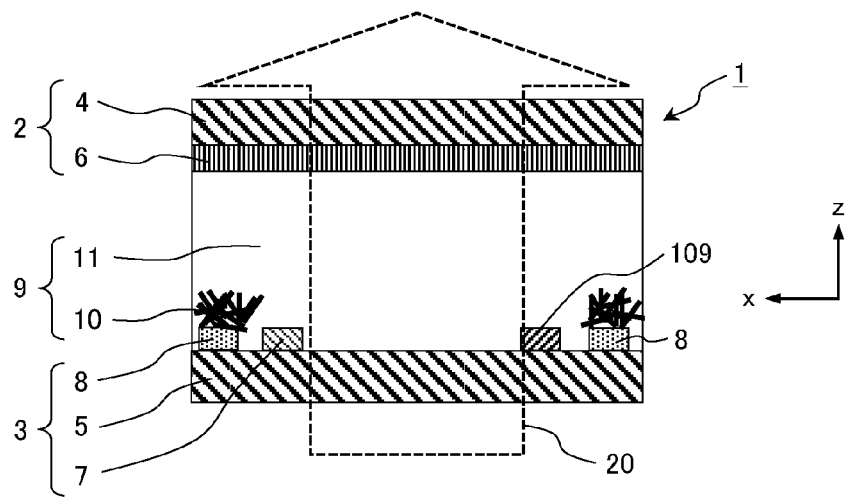
FIG. 23C is a fragmentary cross sectional view of a suspended particle device after assembling (transmissive hold state) on a plane x-z containing a cross sectional line F-F' in FIG. 21.

FIG. 23A to FIG. 23C illustrate a suspended particle device after assembling in cross sectional views along a plane x-z containing a sectional line F-F' in FIG. 21 and they illustrate the state of light control particles 10 in the suspended particle device 1 in each of driving states. FIG. 23A illustrates a light-blocking state of the suspended particle device 1, FIG. 23B illustrates a light-control state of the suspended particle device 1, and FIG. 23C illustrates a transmissive hold state of the suspended particle device 1.

Figure 24A:
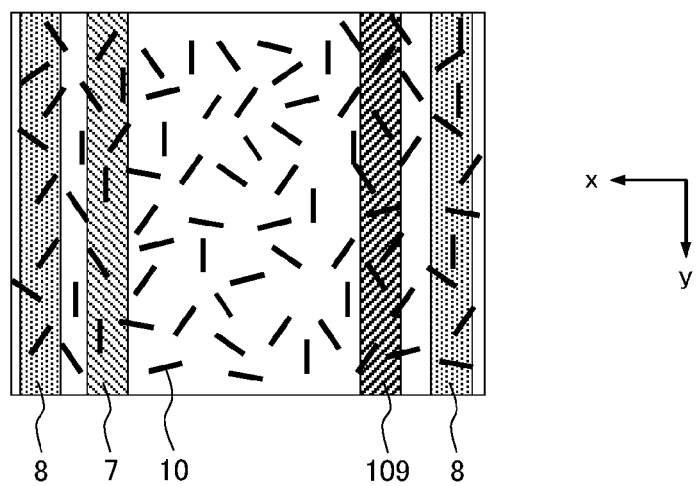
FIG. 24A is a view along a plane x-y for a portion surrounded by a dotted chain G in FIG. 21 as viewed on the side of a first plate member 2 (light-blocking state)
Figure 24B:
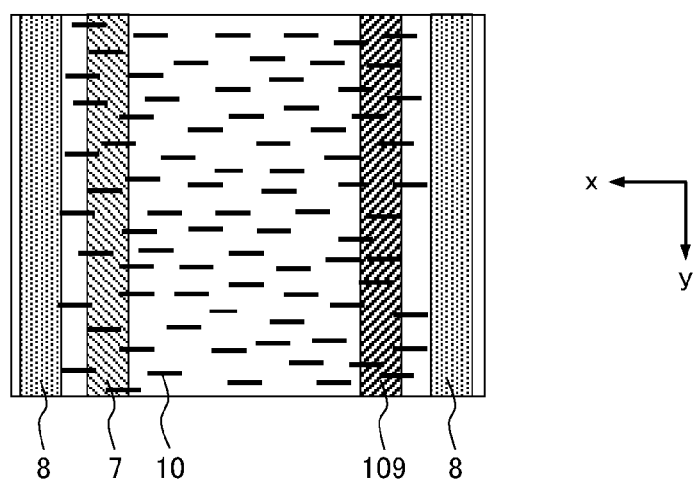
FIG. 24B is a view along a plane x-y for a portion surrounded by a dotted chain G in FIG. 21 as viewed on the side of a first plate member 2 (light-control state)
Figure 24C:
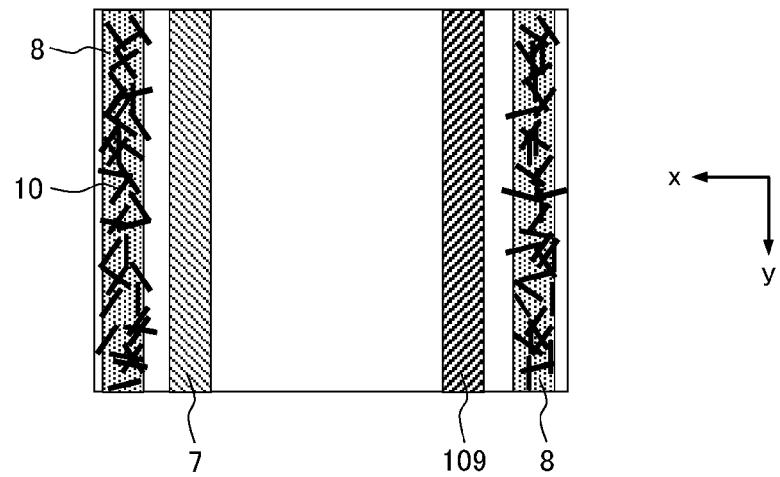
FIG. 24C is a view along a plane x-y for a portion surrounded by a dotted chain G in FIG. 21 as viewed on the side of a first plate-like member 2 (transmissive hold state)

FIG. 24A to FIG. 24C are plan views along a plane x-y of a portion surrounded by a dotted chain G in FIG. 21 as viewed on the side of the first plate member 2, and illustrate the state of the light control particles 10 in the suspended particle device 1 in each of the driving states. FIG. 24A illustrates a light-blocking state of the suspended particle device 1, FIG. 24B illustrates a light-control state of the suspended particle device 1, and FIG. 24C illustrates a transmissive hold state of the suspended particle device 1. The driving waveform for realizing each of the driving methods is identical with that in FIG. 8 for the first embodiment 1 excepting the light-control state.

In the light-blocking state, like in the first embodiment, the light control particles 10 are dispersed substantially uniformly as shown in FIG. 23A and FIG. 24A in which the orientation state of the light control particles 10 are in a random state due to Brownian motion. And the incident light 20 on the suspended particle device 1 is absorbed or scattered. Hence the light cannot transmit and is blocked as a result.

In the light-control state, the light control particles 10 are dispersed substantially uniformly in the liquid suspension 9 as shown in FIG. 23B and FIG. 24B, and an AC voltage $V_P$ at a frequency $f_P$ sufficient for orientation operation is applied between the Y electrode 7 and the Z electrode 109. Hence the light control particles 10 are oriented substantially in the direction of the electric field between the Y electrode 7 and the Z electrode 109.

Figure 25:
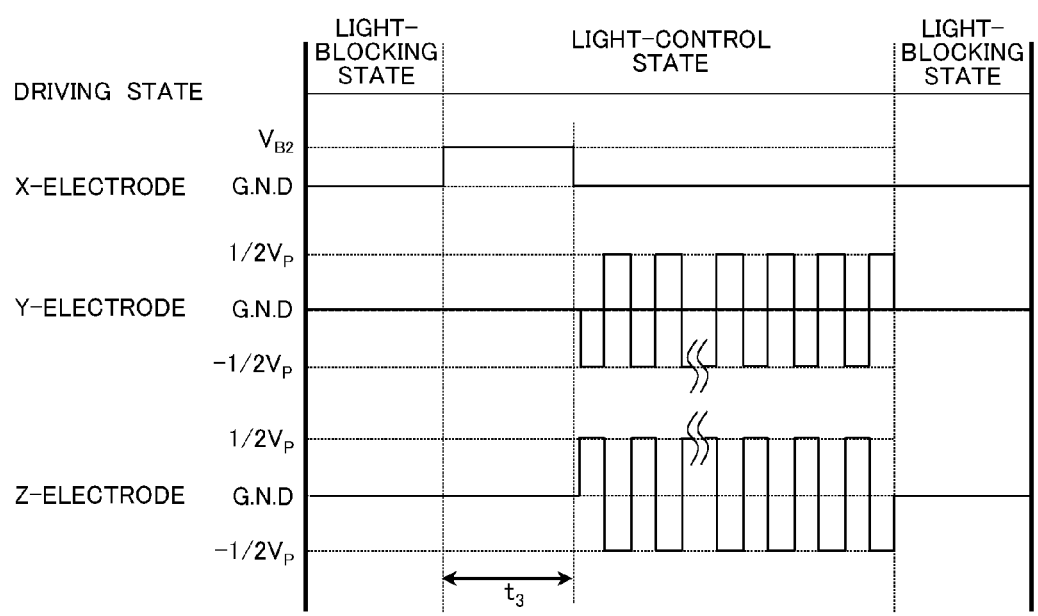
FIG. 25 is a graph showing a driving waveform from the light-blocking state to the light-control state.
Figure 26A:
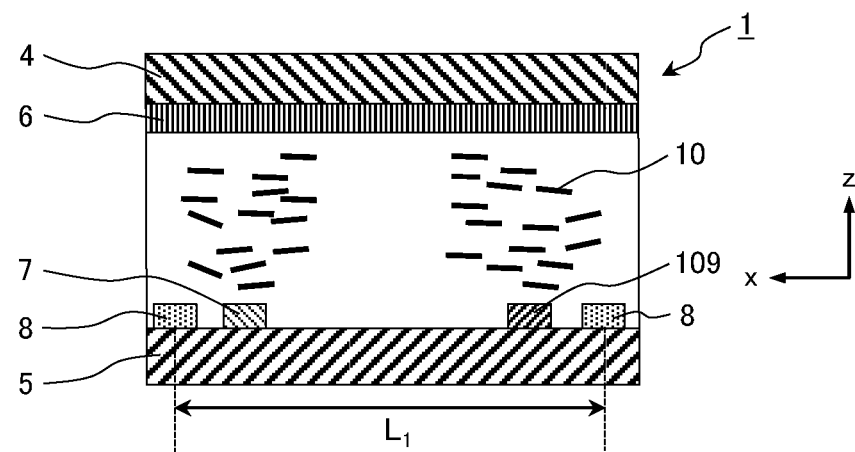
FIG. 26A is a longitudinal cross sectional view illustrating the state derived from control in FIG. 25.
Figure 26B:
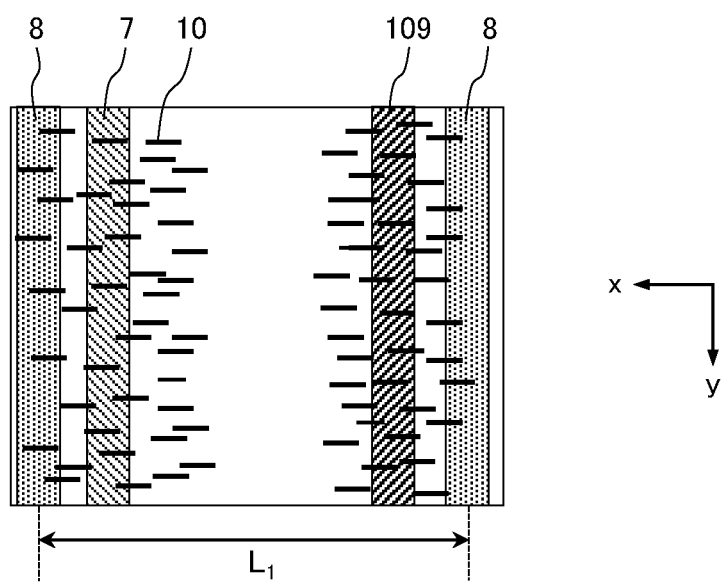
FIG. 26B is a lateral cross sectional view illustrating the state derived from control in FIG. 25.

FIG. 25 is a graph showing a driving waveform of changing the state from the light-blocking state to the light-control state. Further, FIG. 26A and FIG. 26B are cross sectional views corresponding to FIG. 22A and FIG. 22B respectively which illustrate the state caused by control shown in FIG. 25.

In the light-control state in FIG. 25, a voltage $V_{B2}$ is at first applied to the X-electrode 6 and the voltage application is stopped after time $t_3$ where the light control particles 10 are in a state dispersed substantially uniformly in the liquid suspension 9. Change of state from aggregation to dispersion and the dispersion region of the light control particles 10 are controlled by $V_{B2}$ and $t_3$. Then, a light-control state is obtained by making the potential on the X electrode constant or floating and applying a rectangular AC voltage signal waveform to the Y electrode and the Z electrode. Further, a light control region $L_1$ due to the light control particles 10 in a state of applying the AC voltage signal (shown in FIGS. 26A and 26B) is controlled by the control of $V_{B2}$ and $t_3$.

In this embodiment, while the rectangular AC voltage signal waveform is applied, it may be a sinusoidal or triangular AC waveform. Further, in this embodiment, while the reference potential of the X electrode, the Y electrode, and the Z electrode is set to G.N.D, the reference voltage may be changed in accordance with the surface potential $V_c$ of the electrified body 8. $f_P$ represents a range of frequency in which the light control particles 10 can conduct orientation operation uniformly without aggregation, etc. and can maintain the orientation state in the dispersion medium 11, and the frequency range is determined, for example, depending on the concentration, the dielectric constant, the shape, the affinity with the dispersion medium 11 of the light control particles 10, or the viscosity of the dispersion medium 11, and this is 16 Hz or higher and 1000 Hz or lower.

In this embodiment, while $f_P$ and $V_P$ are set constant, $f_P$ and $V_P$ may be changed upon starting of the light control state.

Accordingly, when incident light 20 on the suspended particle device 1 is an unpolarized light, light polarized linearly in the direction perpendicular to the direction of the electric field by the oriented light control particles 10 in the liquid suspension filling space is emitted from the suspended particle device 1. Further, the light control region $L_1$ from which the linearly polarized light is emitted can also be controlled.

In the transmissive hold state, the light control particles 10 are charged negatively. Hence the dispersed light control particles 10 are aggregated to the electrified bodies 8 of narrow width or localized near the electrified bodies 8 as shown in FIG. 23C and FIG. 24C by making the potential of the electrified body 8 higher than that of the X electrode 6, Y electrode 7, and the Z electrode 109. Thus, high transmittance can be obtained since the incident light 20 on the suspended particle device 1 is emitted without being absorbed or scattering by the light control particles 10 excepting the region where the electrified bodies 8 are present.

As the method of aggregating or localizing the light control particles 10 in the transmissive hold state, the particles may be aggregated or localized to the Y electrode 7 or the Z electrode 109 by making the potential on both of the Y electrode 7 and the Z electrode 109 or on one of the Y electrode 7 and the Z electrode 109 higher than that of the electrified bodies 8 as shown in FIG. 20C and FIG. 21C. Further, the particles may also be aggregated or localized to the Y electrode 7 and the Z electrode 109, and the electrified body 8 by making the potential on all of the Y electrode 7, the Z electrode 109, and the electrified body 8 higher than that on the X electrode 6.

A light control device having a function as a polarizer of modulating the incident light 20 to a polarized light in the light-control state can be achieved by using the suspended particle device 1 of this embodiment.

Eighth Embodiment

Figure 27:
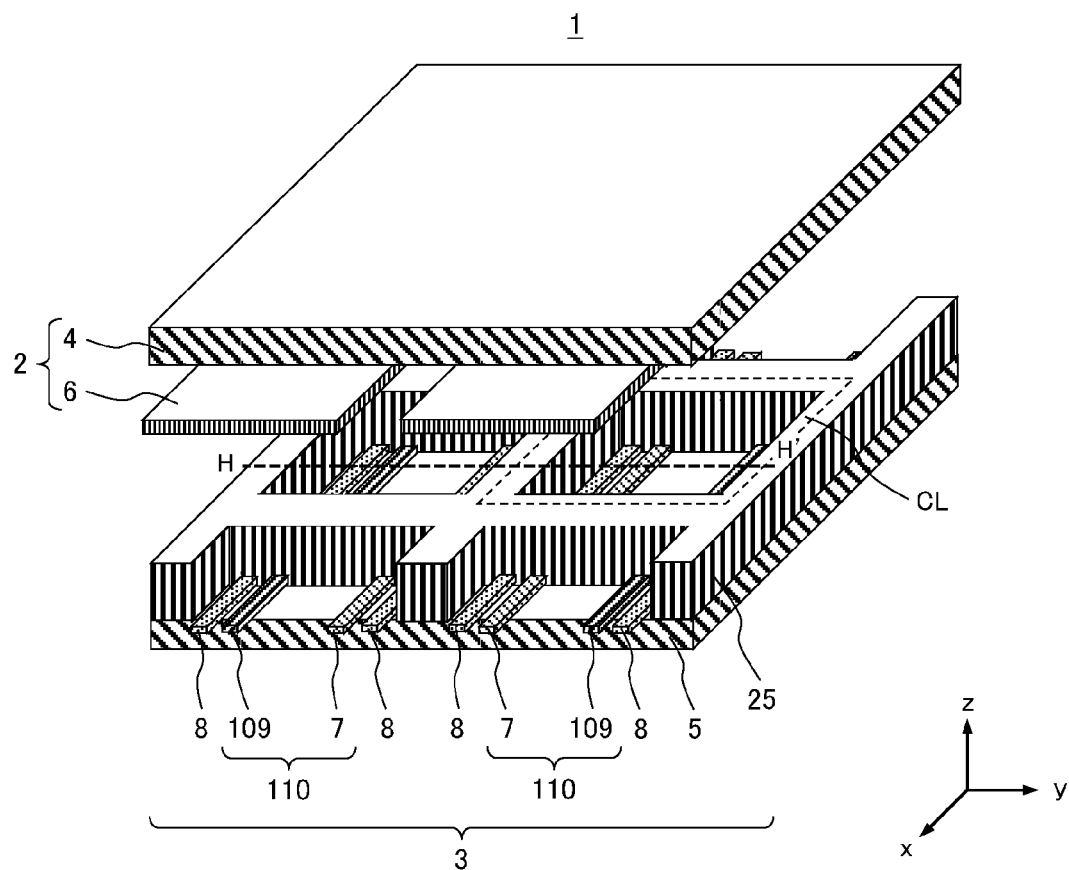
FIG. 27 is an exploded perspective view illustrating a configuration of a suspended particle device of an eighth embodiment.
Figure 28:
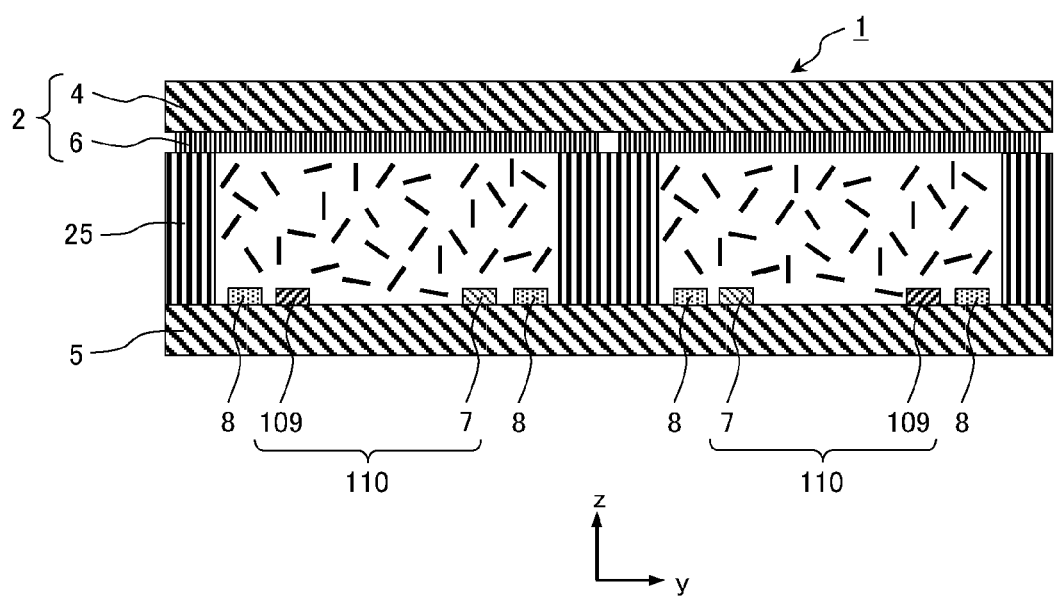
FIG. 28 is a fragmentary cross sectional view of a suspended particle device after assembling on a plane y-z containing a sectional line H-H' in FIG. 27.

The light control device of this embodiment is different from the seventh embodiment in that the configuration of the second plate member 3 of the suspended particle device 1 is different and the device has a polarization plate as a polarizer. Description for other configurations where they are identical with those of one of the first to the seventh embodiments is to be omitted.
(Suspended Particle Device)
FIG. 27 is an exploded perspective view of a suspended particle device 1 investigated by the present inventors. FIG. 28 illustrates a suspended particle device after assembling as a cross sectional view along a plane y-z containing a sectional line H-H' shown in FIG. 27.

In a first plate member 2 in FIG. 27, an X electrode 6 of a transparent electrode formed of indium tin oxide (ITO) is formed on the surface of a first substrate 4 which is a transparent supporting base formed of the glass like in the sixth embodiment. The X electrode 6 may also be formed on the surface of the first substrate 4, not over the entire surface but in a stripe pattern so as to orthogonally intersect the Y electrode 7 and the electrified body 8 and so as to be situated within a box type light control cell CL shown in the drawing.

In the second plate member 3, a Y electrode 7, a Z electrode 109, and an electrified bodies 8 are formed in a stripe pattern in the direction of an axis x on the surface of the second substrate 5 which is a transparent supporting base formed of the glass. An assembly of an electrode pair 110 composed of the Y electrode 7 and the Z electrode 109 are disposed in the same order as that of the adjacent electrode pair 110.

Cuboidal box type ribs 25 are formed so as to surround the electrode pair 110 and the electrified bodies 8 on the surface of the second substrate 5. The rib 25 is an electrically insulating dielectric material formed of the glass or polymer which is pigmented to a predetermined color. In this embodiment, the rib 25 is pigmented black. The arrangement of the electrode pair 110 and the electrified bodies 8 in a region surrounded by the rib 25 as a light control cell may include, in addition to a cuboidal shape, other shapes, for example, a polygonal shape such as honeycomb shape, a geometrical pattern such as a circular shape, and a character type corresponding to the polarization region of a polarization plate 40 and the distance of the electrode pair 110. Further, the Y electrode 7, Z electrode 109, and the electrified body 8 are formed on the surface of the second substrate 5 in this embodiment, but they may be formed on the surface or the inside of the rib 25.

Figure 29A:
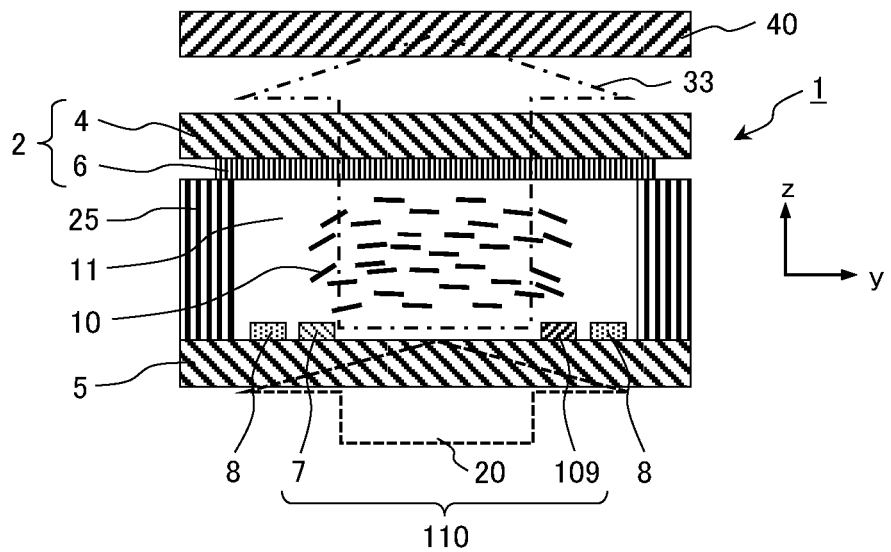
FIG. 29A is a cross sectional view illustrating behavior of light control particles (highly light-blocking state) of the suspended particle device of FIG. 27.
Figure 29B:
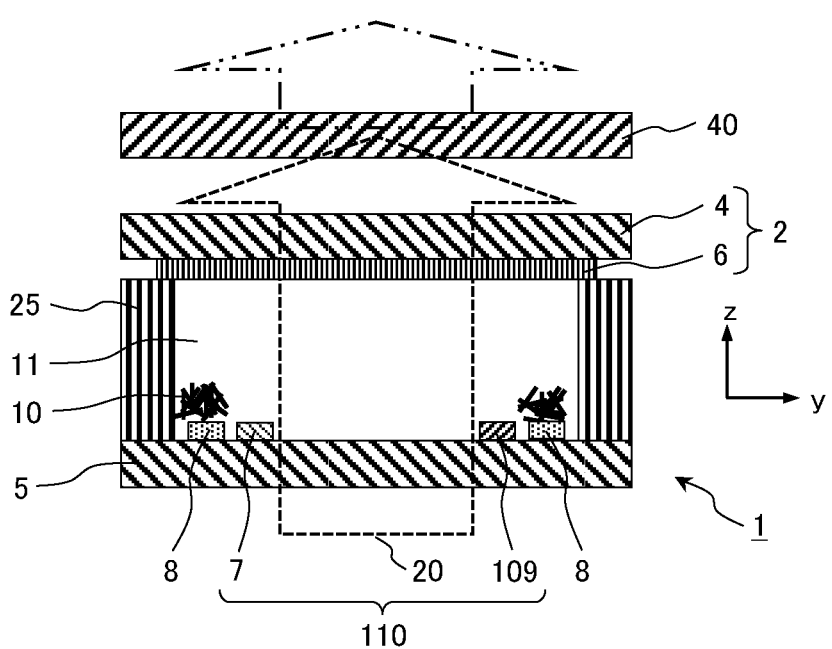
FIG. 29B is a cross sectional view illustrating behavior of light control particles (polarization state) of the suspended particle device of FIG. 27.

The order of the arrangement of the Y electrode 7, the Z electrode 109 and the electrified bodies 8, and the structure of the rib 25 have effects of dividing the liquid suspension filling space on every electrode pair 110 and the electrified body 8, keeping of the liquid suspension filling space and keeping of the distance between the first plate member 2 and the second plate member 3 and, in addition, prevention of cross-talk of electric field to the adjacent electrode pairs 110 and the light control cells due to the DC voltage and the AC voltage.
(Method of Driving Suspended Particle Device)
FIG. 29A and FIG. 29B are cross sectional views illustrating behavior of light control particles in the suspended particle device 1 of this embodiment. FIG. 29A illustrates a high light-blocking state and FIG. 29B illustrates a polarization state.

In the drawings, the polarization plate 40 is disposed such that its transmission axis is in parallel with the direction of the electric field generated by the Y electrode 7 and the electrified bodies 8 relative to emission light from the suspended particle device 1. The polarization plate 40 is a polarization filter in which iodine complexes are oriented in a uniaxial direction in polyvinyl alcohol (PVA) and formed into a sheet-like configuration with triacetyl cellulose (TAC) or the like. In addition to the iodine complex, a dichroic pigment may also be used in addition to the iodine complex.

In a light-blocking state in which the light control particles 10 are dispersed at random, the incident light 20 may leak to some extent. If such phenomenon should occur, there is a problem that no sufficient contrast can be obtained when the driving state is different from that of an adjacent light control cell.

A highly light-blocking state is like that in FIG. 23B, in which light control particles 10 are arranged substantially in the direction of the electric field between the Y electrode 7 and the Z electrode 109 as shown in FIG. 29A. When the incident light 20 on the suspended particle device 1 is an unpolarized light in this state, a linearly polarized light 33 in the direction perpendicular to the direction of the electric field is emitted from the suspended particle device 1 by the light control particles 10 oriented in the liquid suspension filling space. The transmission axis of the polarization plate 40 above the suspended particle device 1 is in a direction parallel to the direction of the electric field. Accordingly, the linearly polarized light 33 is absorbed to the polarization plate 40 to attain a highly light-blocking state.

In the polarization state, the light control particles 10 are aggregated or localized to the electrified body 8 as shown in FIG. 29B.

When unpolarized light is incident on the suspended particle device 1, most of incident light 20 transmits the device since light is not absorbed or scattered by the light control particles 10 in the region of liquid suspension 9 excepting the electrified bodies 8. In this case, the polarization characteristic of emission light remains substantially as that before incidence. Accordingly, unpolarized light is incident on the polarization plate 40 and linearly polarized light can be emitted from the polarization plate 40 in a direction parallel to the direction of the electric field (direction perpendicular to the Y electrode 7 and the Z electrode 109).

Thus, the light control device of this embodiment can increase the difference of the transmittance to the light control cell between the highly light-blocking state and the polarization state and can achieve control for the light control cell at high contrast.

In FIG. 26A and FIG. 26B, the polarization plate 40 is disposed such that emission light from the suspended particle device 1 is incident thereon. On the contrary, the same effect can be obtained also by disposing such that light before incidence on the suspended particle device 1 is incident on the polarization plate 40. The polarization plate 40 may be bonded to the first plate member 2, or may be attached to an incident light source separate from the suspended particle device 1 for preparing linearly polarized light. Further, instead of the polarization plate 40, the suspended particle device 1 may be used as a polarized light generation device.

What is claimed is:
1. A suspended particle device comprising:
a first substrate;
a second substrate;
a first electrode that can be controlled for a potential;
a second electrode that can be controlled for a potential different from that of the first electrode;
an electrified body; and a liquid suspension containing charged light control particles and a dispersion medium, wherein the first electrode, the second electrode and the electrified body are disposed between the first substrate and the second substrate, and the liquid suspension is sealed between the first substrate and the second substrate, wherein the light control particles are capable of being accumulated to a periphery of the electrified body, and wherein an orientation state of the light control particles can be controlled by applying an alternating-current voltage to at least one of the first electrode and the second electrode, and the light control particles can be dispersed into the liquid suspension by applying a direct-current voltage to at least one of the first electrode and the second electrode.

2. The suspended particle device according to claim 1, wherein the first electrode is disposed on a surface of the first substrate, and the second electrode and the electrified body are disposed on a surface of the second substrate.

3. The suspended particle device according to claim 1, wherein a third electrode that can be controlled for a potential different from that of the first electrode and the second electrode is further disposed between the first substrate and the second substrate.

4. The suspended particle device according to claim 3, wherein the third electrode is disposed on a surface of the second substrate.

5. The suspended particle device according to claim 4, having a function of controlling an orientation state of the light control particles by applying an alternating-current voltage between the second electrode and the third electrode.

6. The suspended particle device according to claim 4, having a function of polarizing light incident on the liquid suspension by applying an alternating-current voltage between the second electrode and the third electrode.

7. The suspended particle device according to claim 3, wherein an orientation state of the light control particles can be controlled by applying an alternating-current voltage to at least one of the first electrode, the second electrode and the third electrode, and the light control particles can be dispersed into the liquid suspension by applying a direct-current voltage to at least one of the first electrode, the second electrode and the third electrode.

8. The suspended particle device according to claim 3, wherein the third electrode is light permeable.

9. The suspended particle device according to claim 3, wherein an area of the electrified body is smaller than that of the third electrode.

10. The suspended particle device according to claim 3, wherein the second electrode and the third electrode are disposed in a stripe pattern.

11. The suspended particle device according to claim 1, wherein the first electrode and the second electrode are light permeable.

12. The suspended particle device according to claim 1, wherein an area of the electrified body is smaller than that of the second electrode.

13. The suspended particle device according to claim 1, wherein the second electrode and the electrified body are disposed in a stripe pattern.

14. The suspended particle device according to claim 1, wherein a surface of the electrified body in contact with the liquid suspension has a polar character opposite to that of the light control particles.

15. The suspended particle device according to claim 1, wherein the electrified body is formed of an electret or ferroelectric.

16. The suspended particle device according to claim 1, wherein the light control particles have an optical anisotropy and are formed of one or more of rod-like materials selected from the group consisting of polyperiodides, carbon-base materials, metal materials and inorganic compounds, and an aspect ratio of the light control particles is from 5 to 30.

17. The suspended particle device according to claim 1, having a function capable of accumulating the light control particles to the electrified body by making a surface potential of the electrified body higher than the potential of the first electrode and the second electrode, and a function capable of dispersing the light control particles accumulated to the electrified body into the liquid suspension by making the potential of the first electrode higher than the potential of the second electrode and the surface potential of the electrified body.

18. A light control device comprising:
the suspended particle device according to claim 1; and
a driving device for controlling the suspended particle device.

19. A method of driving a suspended particle device comprising:
a first substrate;
a second substrate;
a first electrode that can be controlled for a potential;
a second electrode that can be controlled for a potential different from that of the first electrode;
an electrified body; and
a liquid suspension containing charged light control particles and a dispersion medium,
wherein the first electrode, the second electrode and the electrified body are disposed between the first substrate and the second substrate, and the liquid suspension is sealed between the first substrate and the second substrate,
the method comprising the steps of:
applying an alternating-current voltage to the liquid suspension by at least one of the first electrode and the second electrode, thereby controlling the orientation state of the light control particles, and dispersing the light control particles into the liquid suspension by applying a direct-current voltage to the liquid suspension by at least one of the first electrode and the second electrode, and
accumulating the light control particles to a periphery of the electrified body.

20. The method according to claim 19, wherein dispersing the light control particle is carried out by making the potential of the first electrode higher than the potential of the second electrode and a surface potential of the electrified body, and wherein accumulating the light control particle is carried out by making the surface potential of the electrified body higher than the potential of the first electrode and the second electrode.

21. The method according to claim 19, wherein an average value of the alternating-current voltage applied to at least one of the first electrode and the second electrode has a polar character identical with a surface potential at a surface of the electrified body in contact with the liquid suspension when the light control particles are in an orientation state.

* * * * *